US 12,450,766 B2

(12) United States Patent
Yoshikuwa et al.

(10) Patent No.: US 12,450,766 B2
(45) Date of Patent: Oct. 21, 2025

(54) IMAGE PROCESSOR, IMAGING DEVICE, ROBOT AND ROBOT SYSTEM

(71) Applicant: Kawasaki Jukogyo Kabushiki Kaisha, Kobe (JP)

(72) Inventors: Eiji Yoshikuwa, Kobe (JP); Toshihiko Miyazaki, Kobe (JP); Seita Ono, Kobe (JP); Tianfen Xu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 485 days.

(21) Appl. No.: 17/638,218

(22) PCT Filed: Aug. 25, 2020

(86) PCT No.: PCT/JP2020/031992
§ 371 (c)(1),
(2) Date: Feb. 25, 2022

(87) PCT Pub. No.: WO2021/039775
PCT Pub. Date: Mar. 4, 2021

(65) Prior Publication Data
US 2022/0292702 A1    Sep. 15, 2022

(30) Foreign Application Priority Data
Aug. 26, 2019  (JP) .................... 2019-154074

(51) Int. Cl.
*G06T 7/70* (2017.01)
*B25J 9/16* (2006.01)
(Continued)

(52) U.S. Cl.
CPC ............ *G06T 7/593* (2017.01); *B25J 9/1697* (2013.01); *G06T 7/70* (2017.01); *G06V 10/44* (2022.01);
(Continued)

(58) Field of Classification Search
CPC .......... B25J 9/1697; B25J 13/08; B25J 19/04; G06T 7/593; G06T 7/70; G06T 7/75;
(Continued)

(56) References Cited

U.S. PATENT DOCUMENTS 9,102,055 B1 * 8/2015 Konolige ............... B25J 9/1612
2005/0131582 A1 * 6/2005 Kazi ...................... B25J 9/1697
                                                           700/259
(Continued)

FOREIGN PATENT DOCUMENTS

CN       105608734 A      5/2016
JP       2009-241247 A   10/2009
(Continued)

OTHER PUBLICATIONS

Bohg e al. "Learning grasping points with shape context." Robotics and Autonomous Systems 58.4 (2010): 362-377. (Year: 2010).*

(Continued)

*Primary Examiner* — Katrina R Fujita
(74) *Attorney, Agent, or Firm* — XSENSUS LLP

(57) ABSTRACT

An image processor includes memory configured to store the shape of an object, extracting circuitry configured to extract a second image of a target range from a first image of the object, distance detecting circuitry configured to process the second image to detect distances from at least three parts projected within the target range to the camera, plane estimating circuitry configured to estimate a plane projected within the target range using the distances based on the at least three parts, angle detecting circuitry configured to detect an angle of the plane with respect to an optical axis of the camera, contour estimating circuitry configured to estimate, based on the shape of the object and the angle of the plane, a contour of the object projected on the first (Continued)

image, and identifying circuitry configured to identify the object on the first image based on the contour.

11 Claims, 18 Drawing Sheets

(51) Int. Cl.
*G06T 7/593* (2017.01)
*G06V 10/44* (2022.01)
*G06V 10/74* (2022.01)
*G06V 10/75* (2022.01)

(52) U.S. Cl.
CPC .......... *G06V 10/752* (2022.01); *G06V 10/761* (2022.01); *G06T 2207/10012* (2013.01); *G06T 2207/30164* (2013.01)

(58) Field of Classification Search
CPC .......... G06T 2207/10012; G06T 2207/30164; G06V 10/44; G06V 10/752; G06V 10/761
See application file for complete search history.

(56) References Cited

U.S. PATENT DOCUMENTS

| | | | | |
|---|---|---|---|---|
| 2006/0088203 | A1* | 4/2006 | Boca | G06T 7/80 382/153 |
| 2006/0104788 | A1* | 5/2006 | Ban | G06T 1/0014 414/729 |
| 2007/0213874 | A1* | 9/2007 | Oumi | B25J 9/1697 700/245 |
| 2010/0004778 | A1* | 1/2010 | Arimatsu | G06T 1/0014 700/214 |
| 2010/0119146 | A1* | 5/2010 | Inazumi | G06T 5/73 901/1 |
| 2011/0280472 | A1* | 11/2011 | Wallack | G06T 7/80 901/14 |
| 2012/0197438 | A1* | 8/2012 | Ogami | B25J 9/1682 901/46 |
| 2012/0201448 | A1* | 8/2012 | Nammoto | G06T 7/0008 382/218 |
| 2013/0085604 | A1* | 4/2013 | Irie | B25J 9/1697 901/46 |
| 2013/0085605 | A1* | 4/2013 | Yasuda | B25J 9/1697 901/46 |
| 2013/0158947 | A1* | 6/2013 | Suzuki | G01B 11/00 702/155 |
| 2014/0046486 | A1* | 2/2014 | Mimura | B25J 19/023 294/213 |
| 2015/0261206 | A1* | 9/2015 | Shiino | B25J 9/1612 700/257 |
| 2015/0262346 | A1 | 9/2015 | Horita | |
| 2017/0053410 | A1 | 2/2017 | Sugahara et al. | |
| 2018/0285684 | A1* | 10/2018 | Levinshtein | G06V 10/751 |
| 2018/0290307 | A1* | 10/2018 | Watanabe | G06T 7/97 |
| 2018/0304467 | A1* | 10/2018 | Matsuura | B25J 13/06 |
| 2019/0143504 | A1* | 5/2019 | Kimoto | B25J 9/1679 700/245 |
| 2019/0160688 | A1* | 5/2019 | Fujita | B25J 13/089 |
| 2019/0184582 | A1* | 6/2019 | Namiki | H04N 23/90 |
| 2019/0289174 | A1* | 9/2019 | Ishii | H04N 23/67 |
| 2020/0014856 | A1* | 1/2020 | Asanuma | H04N 23/695 |
| 2021/0016448 | A1* | 1/2021 | Iida | G01B 11/22 |
| 2021/0372778 | A1* | 12/2021 | Imai | H04N 23/56 |

FOREIGN PATENT DOCUMENTS

| | | |
|---|---|---|
| JP | 2015-76026 A | 4/2015 |
| JP | 2017-39189 A | 2/2017 |
| WO | 2014/061372 A1 | 4/2014 |

OTHER PUBLICATIONS

Herzog et al. "Learning of grasp selection based on shape-templates." Autonomous Robots 36 (2014): 51-65. (Year: 2014).*
Zhang et al. "Dorapicker: An autonomous picking system for general objects." 2016 IEEE International Conference on Automation Science and Engineering (CASE). IEEE, 2016. (Year: 2016).*

* cited by examiner

IMAGE PROCESSOR, IMAGING DEVICE, ROBOT AND ROBOT SYSTEM

CROSS-REFERENCE TO RELATED APPLICATIONS

The present application is based on PCT filing PCT/JP2020/031992, filed Aug. 25, 2020, which claims priority to JP 2019-154074, filed Aug. 26, 2019, the entire contents of each are incorporated herein by reference.

TECHNICAL FIELD

The present disclosure relates to an image processor, an imaging device, a robot, and a robot system.

BACKGROUND ART

Conventionally, operation of a robot is controlled by using a captured image of a workpiece. For example, Patent Document 1 discloses a device which measures a three-dimensional (3D) position and posture of a workpiece based on an image of the workpiece captured by a camera, and controls a tip-end part of a robotic arm and a robot hand based on the measurement information. The camera in Patent Document 1 includes left and right lens mechanisms and image sensors. The workpiece is simultaneously captured by the left and right lens mechanisms, and recorded in the image sensors. By performing image processing in a stereo-matching method between the two images of the workpiece captured by the left and right lens mechanisms, the 3D position and posture of the workpiece can be calculated.

REFERENCE DOCUMENT OF CONVENTIONAL ART

Patent Document

[Patent Document 1] JP2009-241247A

DESCRIPTION OF THE DISCLOSURE

Problem to be Solved by the Disclosure

However, Patent Document 1 does not disclose a method for identifying the workpiece on the two images. The shape, size, color, pattern, etc., of the workpiece projected on the image change variously according to a positional relationship between the camera and the workpiece, and the posture of the workpiece with respect to the camera. Therefore, many processings may be necessary in order to identify the workpiece on the image.

Therefore, one purpose of the present disclosure is to provide an image processor, an imaging device, a robot, and a robot system, capable of reducing an amount of processing required for identifying an object, such as a workpiece, on an image.

SUMMARY OF THE DISCLOSURE

In order to achieve the purpose, an image processor according to one aspect of the present disclosure processes an image, and includes a memory module configured to store the shape of an object, an extracting module configured to extract a second image from a first image, the first image being an image of the object captured by a camera, and the second image being a target range that is a partial area of the first image, a distance detecting module configured to process the second image to detect distances from at least three parts projected within the target range to the camera, a plane estimating module configured to estimate a plane projected within the target range using the distances based on the at least three parts, an angle detecting module configured to detect an angle of the plane with respect to an optical axis of the camera, a contour estimating module configured to estimate, based on the shape of the object stored in the memory module and the angle of the plane, an object contour that is a contour of the object projected on the first image, and an identifying module configured to identify the object on the first image based on the object contour.

Moreover, an image processor according to one aspect of the present disclosure processes an image, and includes a memory module configured to store the shape of an object, an extracting module configured to extract a second image from a first image, the first image being an image of the object captured by a camera, and the second image being a target range that is a partial area of the first image, a distance detecting module configured to process the second image to detect distances from at least three parts projected within the target range to the camera, a plane estimating module configured to estimate a plane projected within the target range using the distances based on the at least three parts, an angle detecting module configured to detect an angle of the plane with respect to an optical axis of the camera, a direction determining module configured to orient the camera so that a direction of the optical axis of the camera matches a first direction perpendicular to the plane, a contour estimating module configured to estimate, based on the shape of the object stored in the memory module, an object contour that is a contour of the object projected on a third image, the third image being an image of the object captured by the camera of which the optical axis is oriented in the first direction, and an identifying module configured to identify the object on the third image based on the object contour.

Moreover, an imaging device according to another aspect of the present disclosure includes a camera, and the image processor according to the one aspect configured to process an image captured by the camera.

Moreover, a robot according to another aspect of the present disclosure includes the imaging device according to the one aspect of the present disclosure, a robotic arm having an end effector configured to perform processing to an article, and a controller configured to control operations of the end effector and the robotic arm based on an image of the article as the object identified by the identifying module.

Moreover, a robot system according to another aspect of the present disclosure includes the robot according to the one aspect of the present disclosure, and a user interface configured to manipulate the robot.

Effect of the Disclosure

According to the art of the present disclosure, an amount of processing required for identifying an object on an image can be reduced.

MODES FOR CARRYING OUT THE DISCLOSURE

Figure 1:
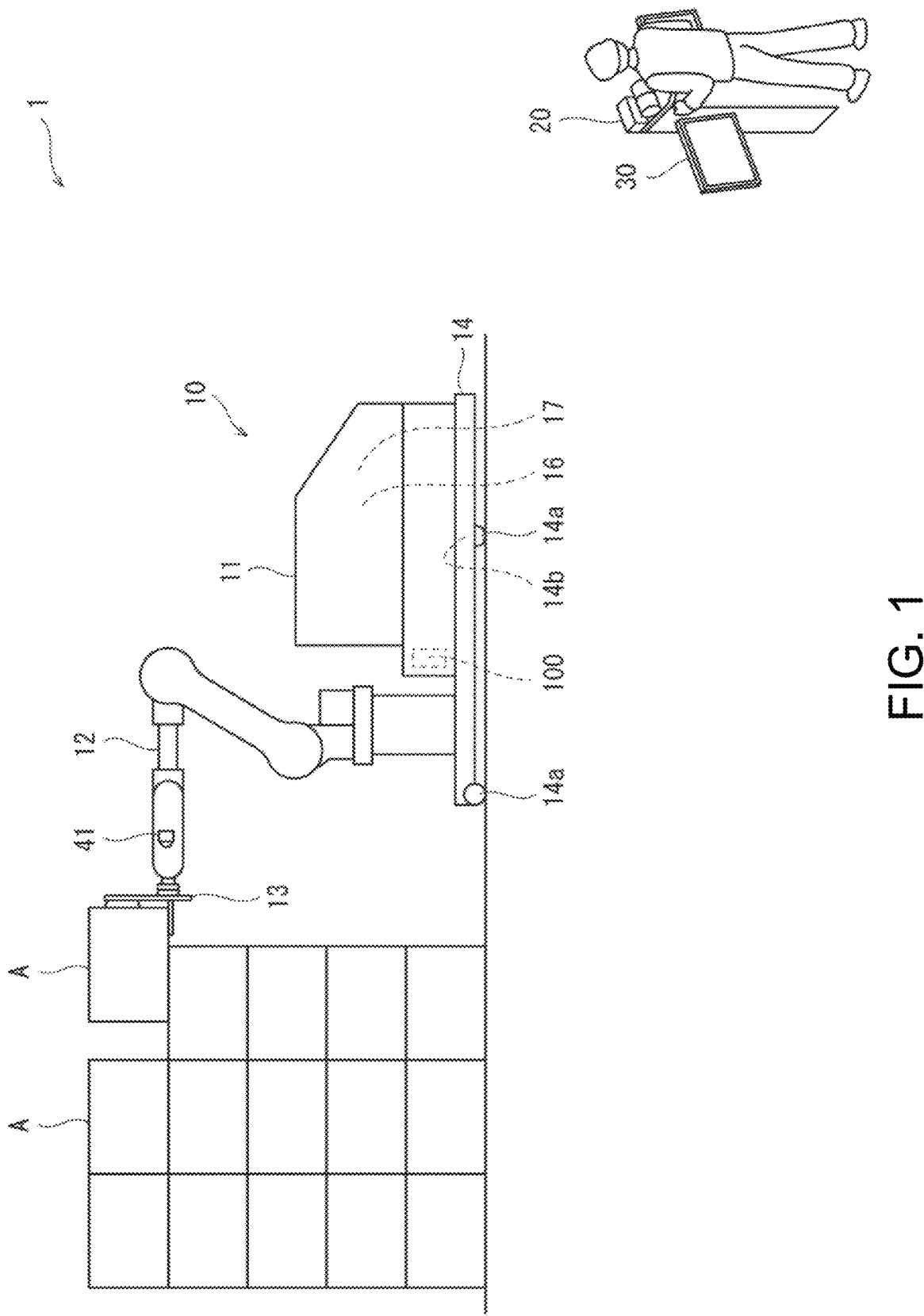
FIG. 1 is a diagram illustrating one example of a configuration of a robot system according to one embodiment.

Hereinafter, one embodiment of the present disclosure is described with reference to the drawings. Note that each embodiment which will be described below is to illustrate a comprehensive or concrete example. Components which are not cited in the independent claim that is the broadest concept among components in the following embodiments will be described as arbitrary components. Each drawing in the accompanying drawings is a schematic drawing, and is not necessarily illustrated exactly. Moreover, in each drawing, the same reference characters are assigned to substantially the same components, and therefore, redundant description may be omitted or simplified. The term "device" or "apparatus" as used in this specification and the appended claims may mean a system including devices or apparatuses, other than meaning a sole device or apparatus.

<Configuration of Robot System>

A configuration of a robot system 1 according to this embodiment is described. FIG. 1 is a diagram illustrating one example of a configuration of the robot system 1 according to this embodiment. As illustrated in FIG. 1, the robot system 1 includes, as components, a robot 10, an input device 20, an output device 30, a camera 41, and a controller 100. Note that, not all of these components are essential.

In this embodiment, the following description is made supposing that, but not limited to, the robot system 1 is a system which performs a work to move an article A by using the robot 10. For example, the robot system 1 may be any system, as long as the robot 10 performs some kind of processing to an article. Further, in the following description, the article A moved by the robot 10 is, but not limited to, a cardboard case. The article A preferably includes a flat surface on its outer surface. Such an article A may be other objects having a given shape, or objects which does not have a fixed shape such as rocks. The input device 20 is a device used for manipulating the robot 10, and outputs to the controller 100 a signal corresponding to an input by an operator. The controller 100 controls the entire robot system 1, and, for example, controls the operation of the robot 10 by outputting to the robot 10 a control signal corresponding to the signal from the input device 20.

<Configuration of Robot>

Figure 2:
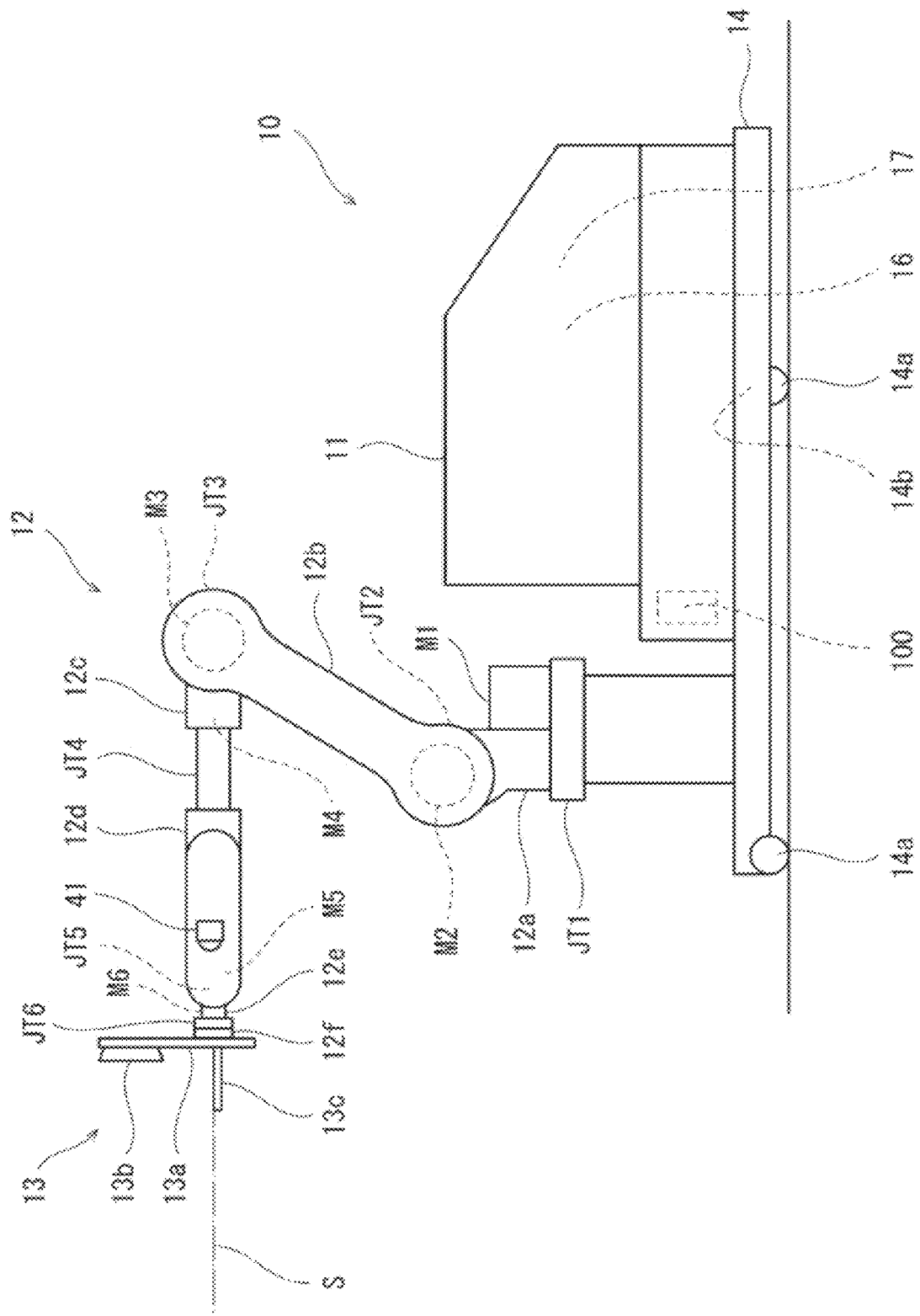
FIG. 2 is an enlarged side view of a robot illustrated in FIG. 1.

A configuration of the robot 10 is described. FIG. 2 is an enlarged side view of the robot 10 illustrated in FIG. 1. As illustrated in FIGS. 1 and 2, the robot 10 is provided with an accommodation part 11, a robotic arm 12, a robot hand (may be referred to as an "end effector") 13, and a carriage 14. The accommodation part 11, the robotic arm 12, and the robot hand 13 are disposed on the carriage 14. The carriage 14 can move the robot 10 on a floor surface etc., and includes, but not limited to, wheels 14a as a traveling device, and a carrier drive 14b (not illustrated) which drives the wheels 14a. For example, the carriage 14 may include other traveling device such as a crawler (may be referred to as "Caterpillar®"). Although the carrier drive 14b uses electric power as a power source and includes a servomotor as an electric motor, other power sources may be used. Such a carriage 14 may be, for example, an AGV (Automated Guided Vehicle). Note that the robot 10 may not be provided with the carriage 14, and may be fixedly placed on the floor surface etc.

The accommodation part 11 is disposed on the carriage 14, and accommodates the controller 100, a power supply 16 (not illustrated), and a negative pressure generator 17 (not illustrated), etc. The power supply 16 supplies electric power to each component of the robot 10 which consumes the electric power. The power supply 16 may include a secondary battery and supply electric power of the secondary battery to each component. The power supply 16 may be connected to an external power supply, such as a commercial power supply or a device outside the robot 10, and supply electric power of the external power supply to each component. The power supply 16 may be provided with the secondary battery as well as being connected to the external power supply. The secondary battery is a storage (rechargeable) battery which can charge and discharge electric power, and may be a lead-acid battery, a lithium ion secondary battery, a nickel-metal hydride battery, a nickel-cadmium storage battery, etc. The power supply 16 may be provided with a primary battery which can only discharge the electric power.

A base part of the robotic arm 12 is fixedly attached to the carriage 14, and the robot hand 13 is attached to a tip-end part of the robotic arm 12. The robot hand 13 can hold the article A which is the cardboard case. The robotic arm 12 and the robot hand 13 operate in accordance with the control by the controller 100, and for example, move the article A held by the robot hand 13 to other places. Although in this embodiment the robot hand 13 holds the article A while sucking by negative pressure, the robot hand 13 may hold the article A by, for example, gripping, scooping, hanging, engaging, sticking, magnetic force, etc. Further, although the robot 10 is configured as an industrial robot of a vertical articulated type as will be described below, it is not limited to this configuration.

The robotic arm 12 includes links 12a-12f which are serially provided in order from a base part to a tip end of the robotic arm 12, joints JT1-JT6 which serially connect the links 12a-12f, and arm drives M1-M6 which rotary drive the joints JT1-JT6, respectively. Operation of the arm drives M1-M6 is controlled by the controller 100. Although the arm drives M1-M6 use electric power as a power source, and include servomotors as electric motors which drive the arm drives M1-M6, respectively, they may use any power source. Note that the number of joints of the robotic arm 12 is not limited to six, but may be seven or more, or one or more and five or less.

The link 12a is attached to the carriage 14 via the joint JT1, and the robot hand 13 is attached to a tip-end part of the link 12f. The joint JT1 couples the carriage 14 and a base-end part of the link 12a so as to be rotatable about a vertical axis perpendicular to the floor surface which supports the carriage 14. The joint JT2 coupes a tip-end part of the link 12a and a base-end part of the link 12b so as to be rotatable about an axis in a horizontal direction with respect to the floor surface. The joint JT3 coupes a tip-end part of the link 12b and a base-end part of the link 12c so as to be rotatable about a horizontal axis. The joint JT4 coupes a tip-end part of the link 12c and a base-end part of the link 12d so as to be rotatable about an axis in a longitudinal direction of the link 12c. The joint JT5 coupes a tip-end part of the link 12d and a base-end part of the link 12e so as to be rotatable about an axis orthogonal to a longitudinal direction of the link 12d. The joint JT6 coupes a tip-end part of the link 12e and a base-end part of the link 12f so as to be rotatable in a twisted manner with respect to the link 12e.

The robot hand 13 includes a body part 13a, one or more suction part(s) 13b, and a support part 13c. The body part 13a has a plate-like shape, and connected, at one principal surface thereof, to the link 12f, and the suction part 13b and the support part 13c are disposed on the other principal surface. The body part 13a rotates together with the link 12f centering on a twist rotary axis S of the link 12f. The support part 13c has a plate-like shape, and projects from the body part 13a in the axis S direction.

The suction part 13b is disposed apart from the support part 13c in the direction perpendicular to the axis S. For example, the suction part 13b has a hollow shape that is for example a tapered cylindrical shape. The suction part 13b is connected to the negative pressure generator 17 via piping (not illustrated). The suction part 13b opens in the axis S direction. A configuration of the negative pressure generator 17 is not particularly limited, as long as it can generate negative pressure at the hollow part of the suction part 13b, and any existing configuration may be used. For example, the negative pressure generator 17 may have a configuration of an ejector which generates negative pressure or vacuum by sending in compressed air, or a configuration of a vacuum pump or a pneumatic cylinder which generates negative pressure or vacuum by sucking air.

The robot hand 13 contacts the suction part 13b to a surface of the article A that is for example a side surface thereof. The robot hand 13 generates negative pressure at the suction part 13b so as to suck the article A through the suction part 13b. Therefore, the robot hand 13 can move the article A while holding the article A, for example lifting up the article A. Further, by the robot hand 13 contacting the support part 13c to a surface of the article A that is for example a bottom surface thereof, the robot hand 13 can hold the article A while supporting it by the support part 13c.

<Configuration of Input Device>

A configuration of the input device 20 is described. As illustrated in FIG. 1, the input device 20 accepts an input of for example a command and information from the operator etc., and outputs the command and information to the controller 100. The input device 20 is connected to the controller 100 via wired communication or wireless communication. A form of the wired communication or the wireless communication may be any form. For example, the input device 20 is used for remote control of the robot 10, and may be disposed apart from the robot 10 by a given distance.

The input device 20 may accept an input of each manipulation which constitutes manual manipulation of the robot 10 by the operator, and output a command value of the manipulation to the controller 100. The input device 20 may accept an input of a manipulation content for automatic manipulation of the robot 10, and output a command value of the manipulation content to the controller 100. The input device 20 may accept an input of information on, for example, the shape and/or the size of the article A to be moved by the robot 10, and output the information to the controller 100.

Such an input device 20 may be provided with a device, such as a handle, a lever, a pedal, a button, a touch panel, a microphone, and a camera. The input device 20 may accept, as the command and information to be inputted, a displacement, a displacement-direction, a displacement-speed and an operational force of the handle or the lever, a depression of the button, a contact, a contact trajectory and a contact pressure to a screen of the touch panel, an audio signal collected by a microphone, an analysis result of an image of gesture of the operator captured by the camera, etc.

<Configuration of Output Device>

A configuration of the output device 30 is described. As illustrated in FIG. 1, the output device 30 is disposed near the input device 20. The output device 30 outputs an image signal acquired from the camera 41 as an image, and presents it to the operator. Although the output device 30 is, for example, a liquid crystal display, or an organic or inorganic EL (Electro-Luminescence) display, it is not limited to this configuration. The output device 30 may include a speaker which emits sound. The output device 30 may output the image and/or the sound for manipulation, which is outputted by the controller 100.

<Configuration of Camera>

A configuration of the camera 41 is described. The camera 41 is a camera which captures a digital image, and allows detection of a three-dimensional (3D) position of an object in the captured image that includes a distance to the object, for example. As illustrated in FIG. 2, the camera 41 is positioned and oriented so as to have a field of view in the forward of the robot hand 13. In detail, the camera 41 is disposed at the link 12d, and oriented toward the tip end of the link 12d along the longitudinal direction of the link 12d. Such a camera 41 can image the article A to be moved by the robot hand 13.

Figure 3:
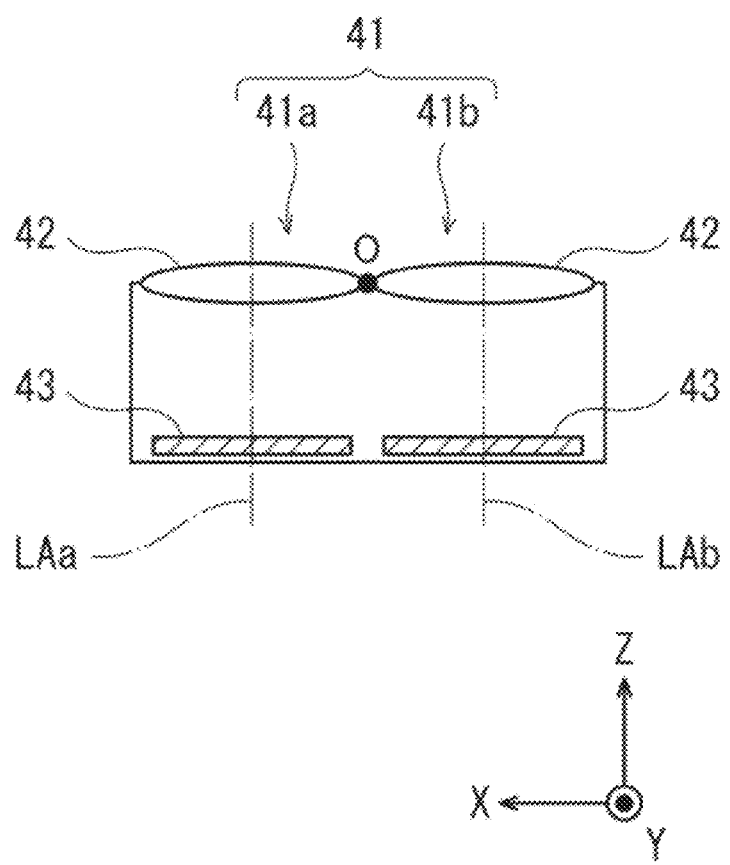
FIG. 3 is a cross-sectional side view illustrating one example of a configuration of a camera according to this embodiment.

FIG. 3 is a cross-sectional side view illustrating one example of a configuration of the camera 41 according to this embodiment. As illustrated in FIG. 3, in this embodiment, the camera 41 is a compound-eye camera including two or more cameras. The camera 41 includes two cameras 41a and 41b which are disposed at locations different from each other. Although the cameras 41a and 41b have similar configurations and performance, they may be different from each other. The cameras 41a and 41b may be provided integrally as illustrated in FIG. 3, or may be provided separately. The cameras 41a and 41b are disposed such that their field of views overlap with each other. Each of the cameras 41a and 41b includes a lens 42 and an image sensor 43. In the camera 41a, the image sensor 43 is disposed on an optical axial center LAa of the lens 42, and in the camera 41b, the image sensor 43 is disposed on an optical axial center LAb of the lens 42. Although the optical axial centers LAa and LAb are in parallel with each other, they may not be in parallel. The optical axial centers LAa and LAb are one example of an optical axis of the camera 41.

The image sensor 43 receives light entered through the lens 42, and generates an image based on the received light. The image sensor 43 is, for example, a CMOS (Complementary Metal-Oxide Semiconductor) image sensor, and a CCD (Charge Coupled Device) image sensor. The image sensor 43 includes light receiving elements which are arrayed planarly in a grid. Each light receiving element outputs to the controller 100 a pixel value indicative of intensity of the received light. The pixel value is, for example, a luminance value. Although two image sensors 43 are disposed in FIG. 3, they may be provided integrally. That is, a single image sensor may be disposed over a range of the two image sensors 43.

A camera coordinate system is set to the camera 41. The camera coordinate system is a local coordinate system based on the cameras 41a and 41b, and is defined by an origin O which is the midpoint between the centers of the lenses 42 of the cameras 41a and 41b, and an X-axis, a Y-axis and a Z-axis which are perpendicularly intersecting with each other. The Z-axis is in parallel with the optical axial centers LAa and LAb. The X-axis is in parallel with a plane including the optical axial centers LAa and LAb. The Y-axis is perpendicular to the plane including the optical axial centers LAa and LAb. A light receiving surface of the image sensor 43 where the image sensor 43 receives light is in parallel with an XY plane. The images captured by the cameras 41a and 41b are images created by projecting the object to the surfaces in parallel with the XY plane.

<Hardware Configuration of Robot System>

Figure 4:
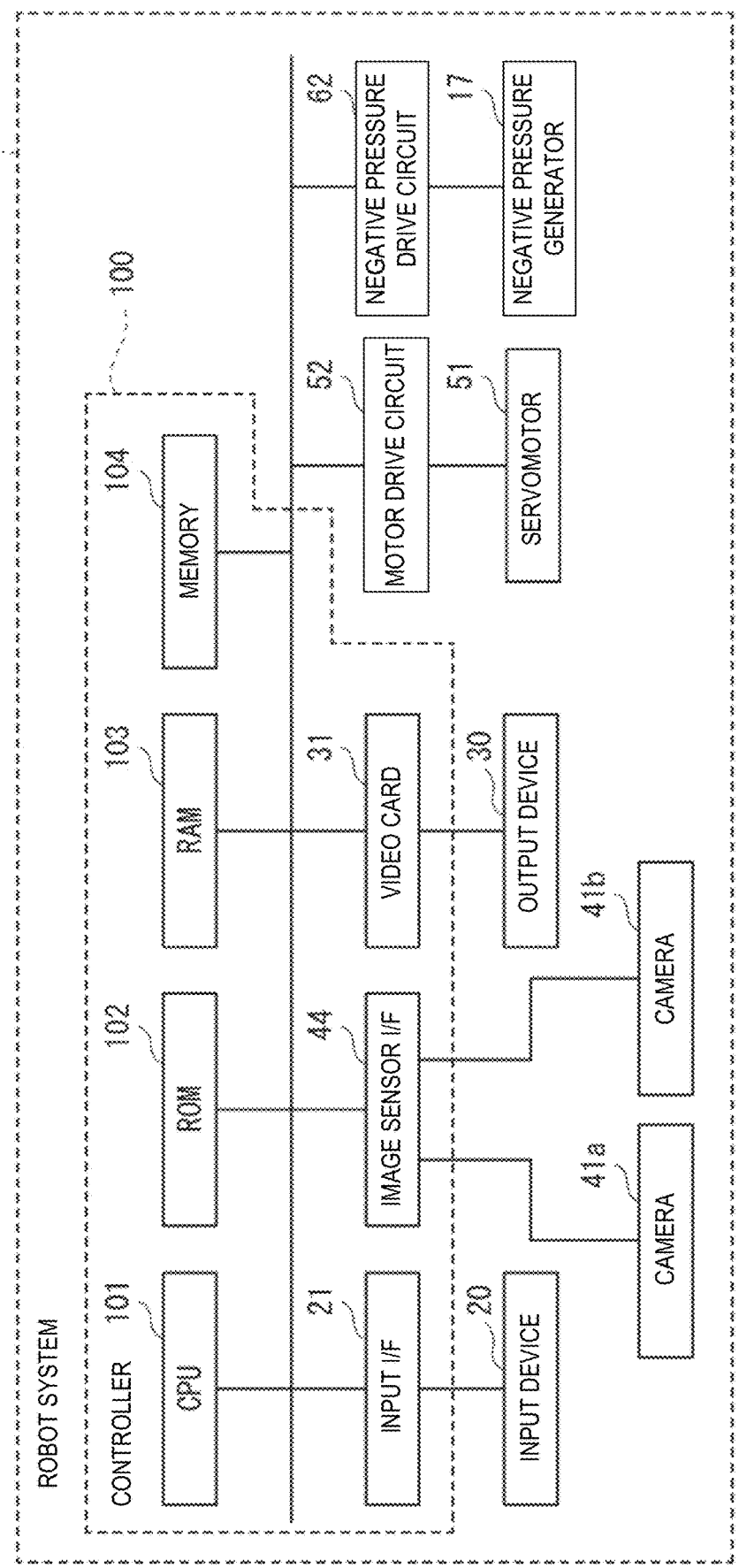
FIG. 4 is a block diagram illustrating one example of a hardware configuration of the robot system according to this embodiment.

A hardware configuration of the robot system 1 is described. FIG. 4 is a block diagram illustrating one example of the hardware configuration of the robot system 1 according to this embodiment. As illustrated in FIG. 4, the robot system 1 includes, as components, a CPU (Central Processing Unit) 101, a ROM (Read Only Memory) 102, a RAM (Random Access Memory) 103, a memory 104, an input I/F (Interface) 21, an image sensor I/F 44, a video card (graphics card) 31, a motor drive circuit 52, a negative pressure drive circuit 62, the input device 20, the cameras 41a and 41b, the output device 30, a servomotor 51, and the negative pressure generator 17. These components are connected to each other by a bus, wired communication, or wireless communication. Note that, not all of the components described above are essential.

In this embodiment, the controller 100 is constituted by, but not limited to, the CPU 101, the ROM 102, the RAM 103, the memory 104, the input I/F 21, the image sensor I/F 44, and the video card 31. The CPU 101 is a processor and controls the entire processing and operation of the robot system 1. The ROM 102 includes a non-volatile semiconductor memory etc., and stores, for example, a program and data for causing the CPU 101 to control the processing and operation. The RAM 103 includes a volatile semiconductor memory etc., and temporarily stores, for example, the program executed by the CPU 101, and under-processing or processed data. The memory 104 includes a storage device, such as a semiconductor memory that is for example a volatile memory or a non-volatile memory, an HDD (Hard Disc Drive), and an SSD (Solid State Drive).

The program for the operation of the CPU 101 is stored in the ROM 102 or the memory 104 in advance. The CPU 101 reads the program from the ROM 102 or the memory 104 to the RAM 103, and deploys the program. The CPU 101 executes commands which are coded in the program deployed in the RAM 103.

The input I/F 21 is connected to the input device 20, and accepts an input of the information, the command, etc., from the input device 20. The input I/F 21 may include, for example, a circuit which converts the input signal.

Corresponding to the execution of the program, the image sensor I/F 44 controls the actuation of the image sensors 43 of the cameras 41a and 41b, and imports the images captured by the cameras 41a and 41b to the RAM 103 or the memory 104. The image sensor I/F 44 may include, for example, a circuit which actuates the image sensors 43.

Corresponding to the execution of the program, the video card 31 processes the images captured by the cameras 41a and 41b, and/or an image generated based on the captured images, and outputs it to the output device 30 so as to be displayed.

The motor drive circuit 52 supplies electric power of the power supply 16 to each servomotor 51, and controls the actuation of the servomotor 51 in accordance with the command of the CPU 101. The servomotor 51 is a servomotor for each of the arm drives M1-M6 of the robotic arm 12, and the carrier drive 14b of the carriage 14. The motor drive circuit 52 controls the actuation of all the servomotors 51.

Note that each servomotor 51 is provided with an electric motor, an encoder which detects a rotational angle of a rotor of the electric motor, and a current detector which detects a current value supplied to the electric motor. Each servomotor 51 operates the electric motor in accordance with the command outputted from the CPU 101 etc., and outputs the detection value of the encoder and the current value of the electric motor to the CPU 101. Based on the detection value of the encoder and the current value fed back from each servomotor 51, the CPU 101 detects, for example, a rotating amount, a rotational speed, a rotational acceleration, and a rotational torque of the rotor of the servomotor 51, and uses the detection result to control, for example, a rotation start, a rotation stop, the rotational speed, the rotational acceleration, and the rotational torque of the servomotor 51. According to this, the CPU 101 can cause each servomotor 51 to stop at an arbitrary rotational position, rotate at an arbitrary rotational speed, and operate at an arbitrary rotational torque. As a result, the CPU 101 can cause the robotic arm 12 and the carriage 14 to operate variously and precisely.

The negative pressure drive circuit 62 supplies the electric power of the power supply 16 to the negative pressure generator 17, and controls the actuation of the negative pressure generator 17 in accordance with the command of the CPU 101.

Each function of the controller 100 as described above may be implemented by a computer system including, for example, the CPU 101, the ROM 102, and the RAM 103, may be implemented by dedicated hardware circuitry including for example an electronic circuit and an integrated circuit, or may be implemented by combination of the computer system and the hardware circuitry. The controller 100 may execute each processing by a sole controller which executes centralized control, or may execute each processing by controllers which collaboratively execute distributed control. The program may be provided as an application, through communication via communication network such as the internet, communication based on a mobile communication standard, another wireless network, a wired network, or broadcasting.

For example, each function of the controller 100 may be implemented by circuitry, such as an LSI (Large Scale Integration) and a system LSI. The functions of the components may each be implemented by a single chip, or a part or all of the functions may be implemented by a single chip. Further, each circuit may be a general-purpose circuit, or a dedicated circuit. As the LSI, for example, an FPGA (Field Programmable Gate Array) which is programmable after manufacturing of the LSI, a reconfigurable processor which is reconfigurable of connection and/or setting of circuit cells inside the LSI, or an ASIC (Application Specific Integrated Circuit) in which circuits having functions are integrated for a particular use, may be used.

<Functional Configuration of Controller>

Figure 5:
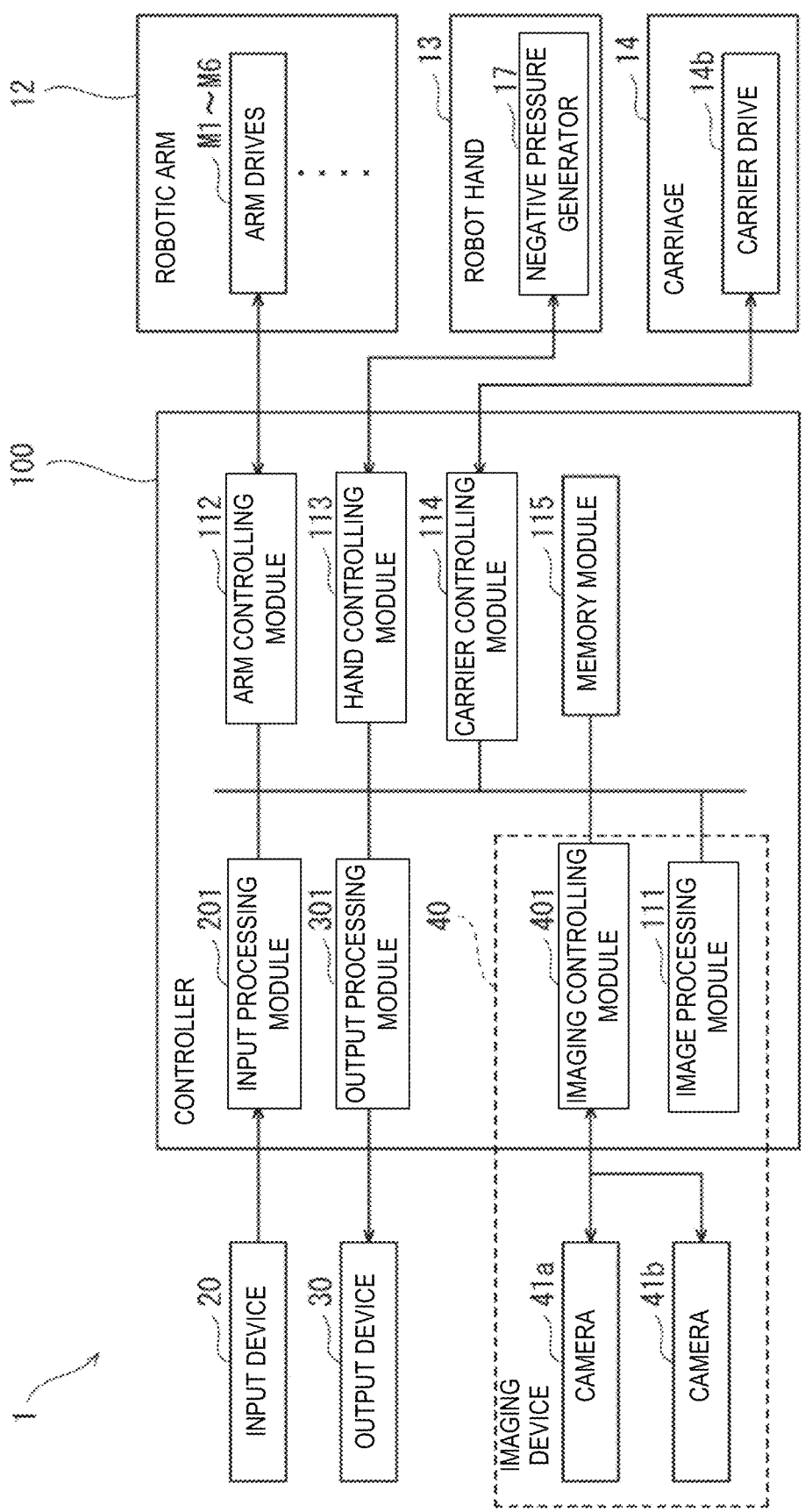
FIG. 5 is a block diagram illustrating one example of a functional configuration of a controller according to this embodiment.

A functional configuration of the controller 100 is described. FIG. 5 is a block diagram illustrating one example of the functional configuration of the controller 100 according to this embodiment. As illustrated in FIG. 5, the controller 100 includes, as functional components, an input processing module 201, an output processing module 301, an imaging controlling module 401, an image processing module 111, an arm controlling module 112, a hand controlling module 113, a carrier controlling module 114, and a memory module 115. Note that, not all of the components described above are essential. The controller 100 is one example of an image processor.

The functions of the functional components other than the memory module 115 are implemented by the CPU 101 etc. The function of the memory module 115 is implemented by the memory 104, the ROM 102, the RAM 103, etc. The imaging controlling module 401, the image processing module 111, and the cameras 41a and 41b constitute an imaging device 40.

The memory module 115 stores various information, and the stored information can be read out. The memory module 115 stores camera parameters of the cameras 41a and 41b, and the shape, the size, etc., of an article which may be transferred by the robot 10. Further, the memory module 115 stores information on a range to be processed by the image processing module 111 in the images captured by the cameras 41a and 41b. The memory module 115 may store a program.

The camera parameters include an external parameter and an internal parameter. The external parameter is, for example, a parameter indicative of the positions and orientations of the cameras 41a and 41b. The internal parameter is, for example, a parameter indicative of distortion of the lenses of the cameras 41a and 41b, a focal length, the size of one pixel of the image sensor 43, and a pixel coordinate of the optical axial center. The pixel coordinate is a coordinate in a unit of pixel, and is a two-dimensional (2D) coordinate on the image.

The shape of the article is a 3D and/or a 2D shape of the article. The shape of the article may be stored in the memory module 115 as information indicating the 3D and/or 2D shape of the article. Each of the 3D shape and the 2D shape of the article may be stored in the memory module 115 as a 3D model and a 2D model of the article, respectively. For example, the 2D shape of the article may be a contour shape of the article when the article is projected on a projection plane from various directions.

The size of the article indicates the size of the actual object, that is, the actual size. The size of the article may indicate a dimension of each part of the article in the 3D shape and the 2D shape, or may indicate a dimension of a characteristic part in the 3D shape and the 2D shape. For example, the dimension of the characteristic part may be a representative dimension of the contour of the article that is for example a width, a height and a depth of the contour, and a representative partial dimension of the article that is for example a dimension of a side (edge) and a cross-sectional dimension.

The input processing module 201 outputs the command, the information, etc., acquired from the input device 20 to each functional component of the controller 100.

The output processing module 301 outputs to the output device 30 the images captured by the cameras 41a and 41b, the image processed by the image processing module 111, and output information such as an operation result and a detection result of each functional component of the controller 100. The output processing module 301 outputs a screen for the manipulation of the robot 10 to the output device 30.

The imaging controlling module 401 controls the operation of the cameras 41a and 41b. The imaging controlling module 401 may cause the cameras 41a and 41b to capture images in accordance with an imaging execution command inputted into the input device 20. The imaging controlling module 401 causes the cameras 41a and 41b to capture images while synchronizing with each other. The imaging controlling module 401 outputs to the memory module 115 the images captured by the cameras 41a and 41b at the same timing while associating them with each other.

The image processing module 111 identifies the article projected on the images based on the images captured by the cameras 41a and 41b, and detects the 3D position and posture of the article. The image processing module 111 outputs the information on the 3D position and posture of the article to the arm controlling module 112, the hand controlling module 113, and the carrier controlling module 114. The image processing module 111 may output the information to the memory module 115 to be stored therein. Details of the image processing module 111 will be described later.

In accordance with the command received from the input processing module 201, the arm controlling module 112 controls the operation of the arm drives M1-M6 using the information received from the image processing module 111 so as to cause the robotic arm 12 to operate correspondingly. The arm controlling module 112 detects, based on the operation amounts the rotating amounts of the servomotors 51 of the arm drives M1-M6 that are for example the rotating amounts thereof, the positional and postural information including the position, the posture, the moving direction, the moving speed, etc., of each of the links 12a-12f and the robot hand 13 of the robotic arm 12. The arm controlling module 112 controls the operation of the arm drives M1-M6 based on the positional and postural information. Further, the arm controlling module 112 outputs the positional and postural information to the hand controlling module 113 and the carrier controlling module 114.

The hand controlling module 113 controls the operation of the negative pressure generator 17 in accordance with the command received from the input processing module 201. For example, the hand controlling module 113 may detect, based on the information received from the image processing module 111 and the positional and postural information of the robot hand 13 received from the arm controlling module 112, contact or approach between the suction part 13b and the article, and after the detection, the hand controlling module 113 may actuate the negative pressure generator 17 so that the suction part 13b sucks the article.

The carrier controlling module 114 controls the operation of the carrier drive 14b in accordance with the command received from the input processing module 201 so that the carriage 14 operates correspondingly. For example, the carrier controlling module 114 may detect whether the to-be-moved article is within a reachable range of the robotic arm 12 based on the information received from the image processing module 111 and the positional and postural information of the robotic arm 12 and the robot hand 13 received from the arm controlling module 112. If the to-be-moved article is detected to be outside the reachable range, the carrier controlling module 114 may operate the carriage 14 to approach the article.

Note that the carrier controlling module 114 may detect the position and orientation of the carriage 14 based on the operation amount of the servomotor 51 of the carrier drive 14b that is for example the rotating amount thereof, and may control the carrier drive 14b based on the detected position and orientation. Further, the carriage 14 may be provided with a positioning device, such as a GPS (Global Positioning System) receiver, and an IMU (Inertial Measurement Unit), and may use a measurement result of the positioning device to detect the position and orientation of the carriage 14. Moreover, the carrier controlling module 114 may detect, for example, weak inductive current from an electrical wire buried under the floor surface, and may detect the position and posture of the carriage 14 based on the detection value.

<Functional Configuration of Image Processing Module>

Figure 6:
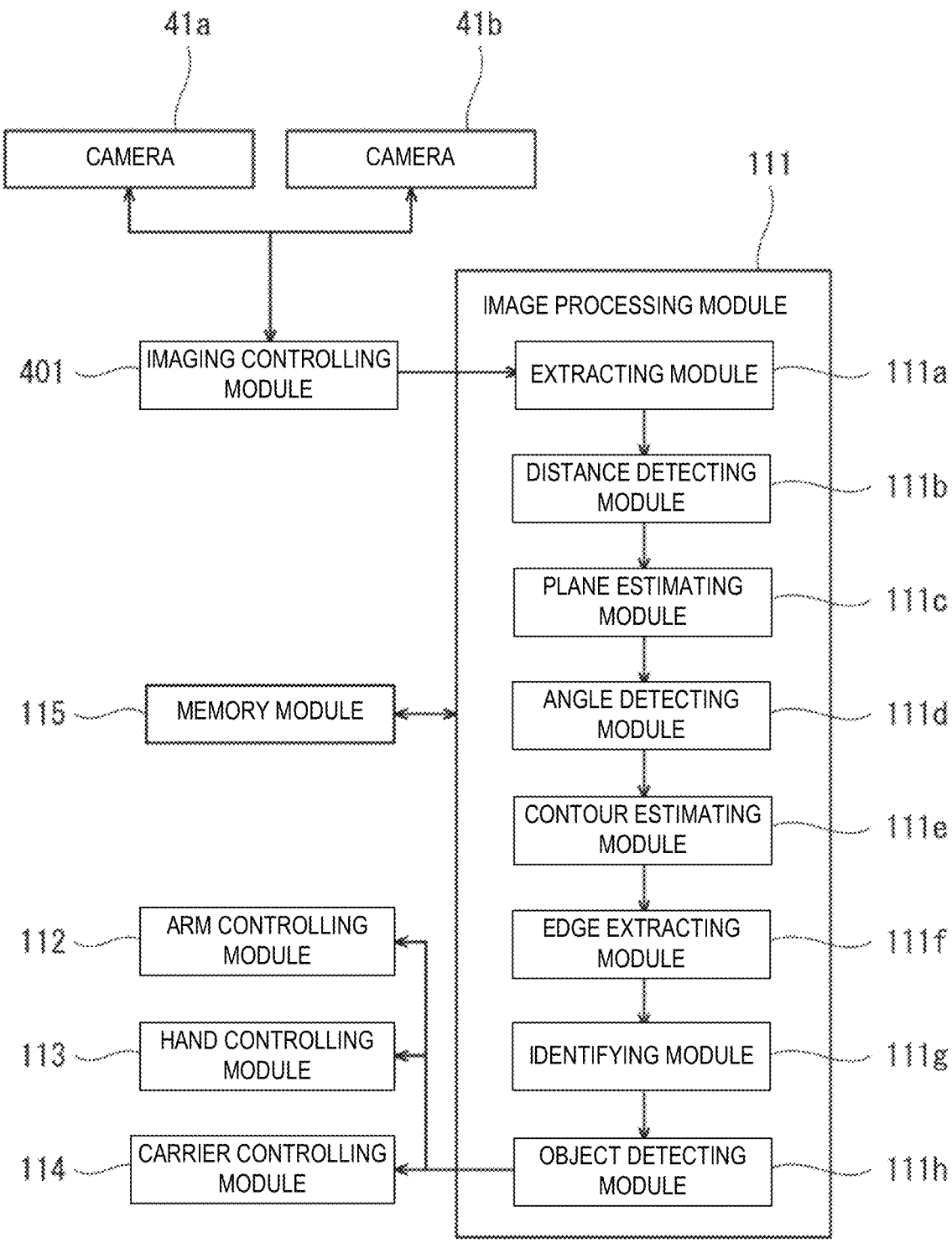
FIG. 6 is a block diagram illustrating one example of a functional configuration of an image processing module according to this embodiment.

A functional configuration of the image processing module 111 is described. FIG. 6 is a block diagram illustrating one example of the functional configuration of the image processing module 111 according to this embodiment. As illustrated in FIG. 6, the image processing module 111 includes, as components, an extracting module 111a, a distance detecting module 111b, a plane estimating module 111c, an angle detecting module 111d, a contour estimating module 111e, an edge extracting module 111f, an identifying module 111g, and an object detecting module 111h.

Figure 7:
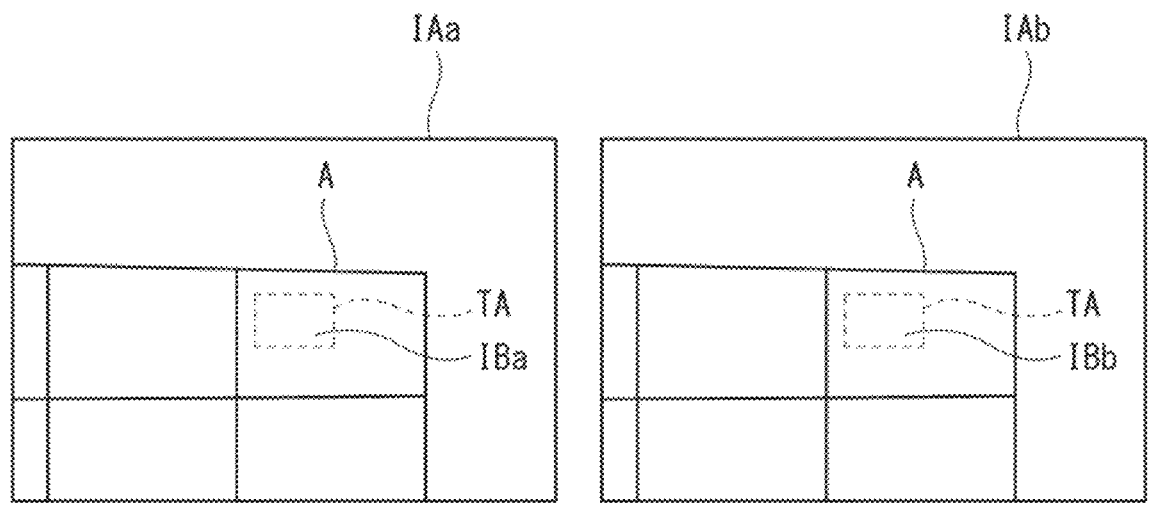
FIG. 7 is a diagram illustrating one example of images captured by two cameras.

FIG. 7 is a diagram illustrating one example of the images captured by the cameras 41a and 41b. As illustrated in FIGS. 6 and 7, the extracting module 111a extracts, from images IAa and IAb captured by the cameras 41a and 41b (hereinafter, may be referred to as a "first image"), images IBa and IBb of a target range TA which is a partial area (hereinafter, may be referred to as a "second image"), respectively, and then outputs the extracted images to the distance detecting module 111b. The first images IAa and IAb are images captured at the same timing. The position, the shape, and the size of the target range TA is identical between the first images IAa and IAb, and are set in advance. Information on the position, the shape, and the size of the target range TA is stored in the memory module 115. The position, the shape, and the size of the target range TA may be set, for example, using the pixel coordinates.

The target range TA has a rectangular shape smaller than the first images IAa and IAb, and is disposed at the center of each of the first images IAa and IAb. Note that the size, the shape and the position of the target range TA are not limited in particular, as long as the target range TA is smaller than the first images IAa and IAb, and is disposed within each of the first images IAa and IAb. As will be described later, the target range TA preferably has a shape and a size with which the plane estimating module 111c can estimate a plane area of the article in the second images IBa and IBb. For example, the target range TA may be smaller than a contour of a single article projected on the first image. As the size of the target range TA becomes smaller, an amount of processing of the distance detecting module 111b and the plane estimating module 111c can be reduced.

Further, the position, the shape, and the size of the target range TA may be changeable. For example, the change may be performed through the input device 20. When information on the changed position, shape and size of the target range TA is inputted into the input device 20, the extracting module 111a replaces, that is, updates the position, the shape, and the size of the target range TA stored in the memory module 115, by the changed position, shape, and size of the target range TA. In this manner, the position, the shape, and the size of the target range TA may be arbitrarily settable.

The distance detecting module 111b processes the second images IBa and IBb to detect an actual distance from the object, which is projected within the target range TA, to the camera 41, and outputs the detected distance to the plane estimating module 111c. A position of a reference point of the distance in the camera 41 may be an arbitrary position. For example, the reference point may be set in the camera 41a, set in the camera 41b, or set to the midpoint O (see FIG. 3) between the cameras 41a and 41b. In this embodiment, the distance detecting module 111b calculates, for all pixel pairs of the second images IBa and IBb, a 3D distance which is an actual distance between the object, which is projected in each pixel pair, and the camera 41 (hereinafter, may simply be referred to as a "distance"). The pixel pair of the second images IBa and IBb is a pixel pair corresponding to each other and projecting the same object. Note that the distance detecting module 111b may calculate the distance for at least three pixel pairs of the second images IBa and IBb, which are located at different pixel positions.

For example, the distance detecting module 111b detects, by a stereo vision using the second images IBa and IBb, the distance from the object, which is projected on each of the at least three pixel pairs, to the camera 41. At this time, the distance detecting module 111b uses the second images IBa and IBb and the camera parameters of the cameras 41a and 41b stored in the memory module 115. In detail, the distance detecting module 111b detects, for each pixel on the second image Ma, a pixel coordinate of the concerned pixel, and a pixel coordinate of a corresponding point on the second image IBb where the same object as the concerned pixel on the second image IBa, is projected. The detection method may be any existing method.

The distance detecting module 111b calculates a disparity between the second images IBa and IBb, which is caused corresponding to the distance between the object projected on the pixel and the camera 41. The "disparity" is a difference in a direction or a position of a target point when the same target point is viewed by the cameras 41a and 41b located at different positions. The disparity corresponds to a positional deviation between the pixels of the second images Ma and IBb projecting the same point. That is, the difference in the pixel positions in the pixel coordinates between the pixel pair is the disparity. The distance detecting module 111b calculates, by the stereo vision using the disparity based on the two pixel coordinates of the pixel pair, and the camera parameters, the distance between the object projected on the pixel pair and the camera 41. The distance detecting module 111b executes the above processing for all the pixels on the second image Ma. Therefore, the distance detecting module 111b calculates a distance value at each pixel position. The distance detecting module 111b may generate a distance image based on the distance value at each pixel position as the pixel value of the concerned pixel.

Further, the distance detecting module 111b may use the distance value of each pixel of at least either one of the second image IBa or IBb, and directions of lines of sight from the cameras 41a and 41b to the object projected on the concerned pixel so as to calculate an actual 3D position of the object projected on the concerned pixel, and output the calculated 3D position to the plane estimating module 111c. Below, the "3D position of the object projected on the pixel" may be referred to as the "3D position corresponding to the pixel." The 3D position may be indicated by, for example, a 3D coordinate in the world coordinate system indicating a position on earth, or in the camera coordinate system.

The plane estimating module 111c estimates a plane projected within the target range TA using the distances based on the at least three parts in at least either one of the second image IBa or IBb. Although in this embodiment description is made supposing that a single part is a single pixel, it is not limited to this configuration. For example, a single part may be a single point, a single pixel, or a single set of pixels. The plane estimating module 111c acquires from the distance detecting module 111b, or calculates by itself, 3D positions corresponding to the at least three pixels of the second image IBa or IBb. The plane estimating module 111c estimates the plane based on the 3D positions corresponding to the at least three pixels. The plane estimating module 111c may calculate, as a plane of an estimation target, a plane passing at or near the 3D positions corresponding to the at least three pixels. The plane estimating module 111c outputs information indicative of the estimated plane that is the calculated plane to the angle detecting module 111d. Such information indicates the estimated plane in a 3D space. The estimated plane may be indicated by a coordinate in the world coordinate system, the camera coordinate system, etc.

Alternatively, the plane estimating module 111c may average the distance values of the pixels of the second image IBa or IBb so as to remove noise components, and perform smoothing. The method for the averaging may be any existing method. The plane estimating module 111c may execute the averaging for all of the pixels of the second image IBa or IBb, or for some of the pixels. In the latter case, the plane estimating module 111c may extract, from the second image IBa or IBb, the pixels of which a difference in the distance values between the adjacent pixels is below a first threshold, and may average the pixel set of the extracted pixels. The first threshold may be arbitrarily set according to, for example, smoothness and roughness of the plane to be estimated, and may be stored in the memory module 115. When the pixel sets are extracted, the plane estimating module 111c may extract pixel sets of which a distance between the pixel sets is within a second threshold, and may regard the extracted pixel sets as a pixel set indicating a single plane. The second threshold may be arbitrarily set according to the shape of the article etc., and may be stored in the memory module 115.

The plane estimating module 111c calculates the 3D position corresponding to the pixel based on the averaged distance value of each pixel, and the directions of the lines of sight from the cameras 41a and 41b to the object projected on the concerned pixel. Then, the plane estimating module 111c calculates the plane passing at or near the 3D position corresponding to the pixel, as the plane of the estimation target.

Figure 8:
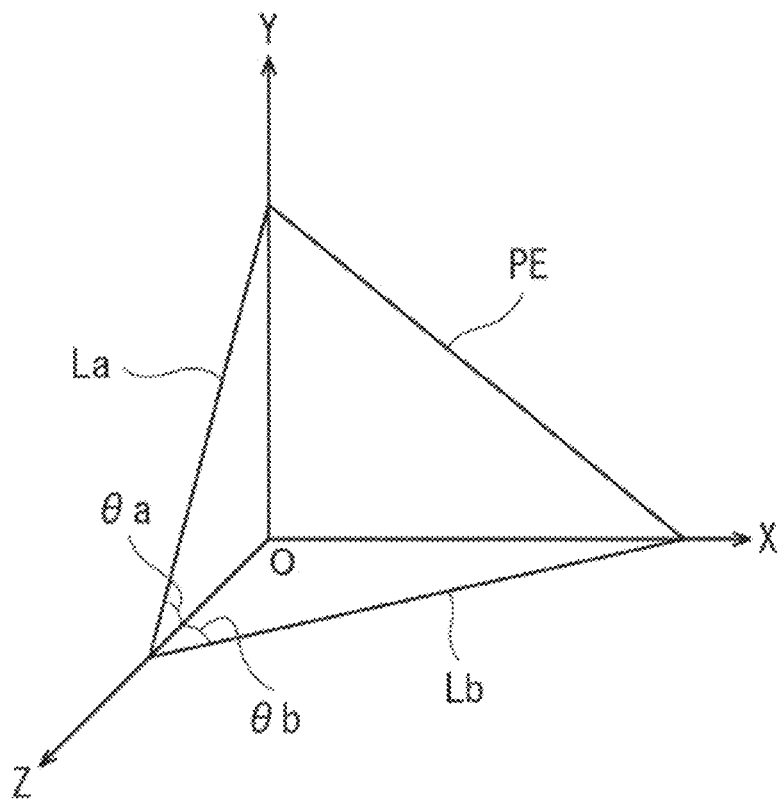
FIG. 8 is a diagram illustrating one example of an estimated plane in a camera coordinate system.

The angle detecting module 111d detects an angle of the estimated plane with respect to the optical axial centers LAa and LAb of the cameras 41a and 41b, and outputs the detected angle to the contour estimating module 111e. For example, the angle detecting module 111d calculates the angle based on the coordinates or functions indicating the estimated plane, and the coordinates or functions indicating the optical axial centers LAa and LAb. For example, as illustrated in FIG. 8, the angle detecting module 111d may use the camera coordinate system to calculate the angle. FIG. 8 is a diagram illustrating one example of the estimated plane in the camera coordinate system.

The angle of the estimated plane is an angle between an estimated plane PE and a Z-axis. In this embodiment, the angle detecting module 111d calculates an angle θa formed by the Z-axis intersecting with an intersection line La of the estimated plane PE with a YZ plane. The angle θa takes a positive value at an angle in the positive direction on the Y-axis, whereas the angle θa takes a negative value at an angle in the negative direction on the Y-axis. In FIG. 8, the angle θa takes a positive value. Moreover, the angle detecting module 111d calculates an angle θb formed by the Z-axis intersecting with an intersection line Lb of the estimated plane PE with the XZ plane. The angle θb takes a positive value at an angle in the positive direction on the X-axis, whereas the angle θb takes a negative value at an angle in the negative direction on the X-axis. In FIG. 8, the angle θb takes a positive value. The angle detecting module 111d calculates the angles θa and θb as the angles of the estimated plane. Accordingly, an inclining direction and an inclination angle of the estimated plane with respect to the Z-axis can be identified.

The contour estimating module 111e estimates, based on the shape of the article A stored in the memory module 115 and the angles of the estimated plane, the contour of the article A projected on the first images IAa and IAb. The contour estimating module 111e outputs information on the estimated contour to the identifying module 111g. In detail, the contour estimating module 111e regards the angles between the estimated plane and the Z-axis as angles indicative of the posture of the article A with respect to the optical axial centers LAa and LAb. At this time, the contour estimating module 111e extracts, from the shape of the article A, a plane on the outer surface of the article A. Further, the contour estimating module 111e calculates a posture of the article A in which angles between the extracted plane and the optical axial centers LAa and LAb, which are the angles between the extracted plane and the Z-axis, match the angles between the estimated plane and the Z-axis, and regards the calculated posture as the posture of the article A.

Further, the contour estimating module 111e calculates, based on the shape of the article A, a contour shape of a projection image of the article A on the XY plane in the calculated posture (hereinafter, may be referred to as a "contour shape"). The contour shape corresponds to a contour shape of the article A projected on the first images IAa and IAb. The contour shape may be deformed from a contour shape of the article A when seen in a direction perpendicular to the extracted plane, and indicates an appearing contour shape.

As described above, the contour estimating module 111e estimates, as the contour shape of the article A projected on the first images IAa and IAb, the shape which is deformed from the shape of the article A corresponding to the angles of the estimated plane. Note that the contour estimating module 111e may use the 3D model of the article A as the shape of the article A. According to this, a calculation accuracy of the contour shape of the article A may improve. Further, when postures of the article A are calculated because of, for example, existence of extracted planes, the contour estimating module 111e calculates the contour shape of the article A in each posture.

Figure 9:
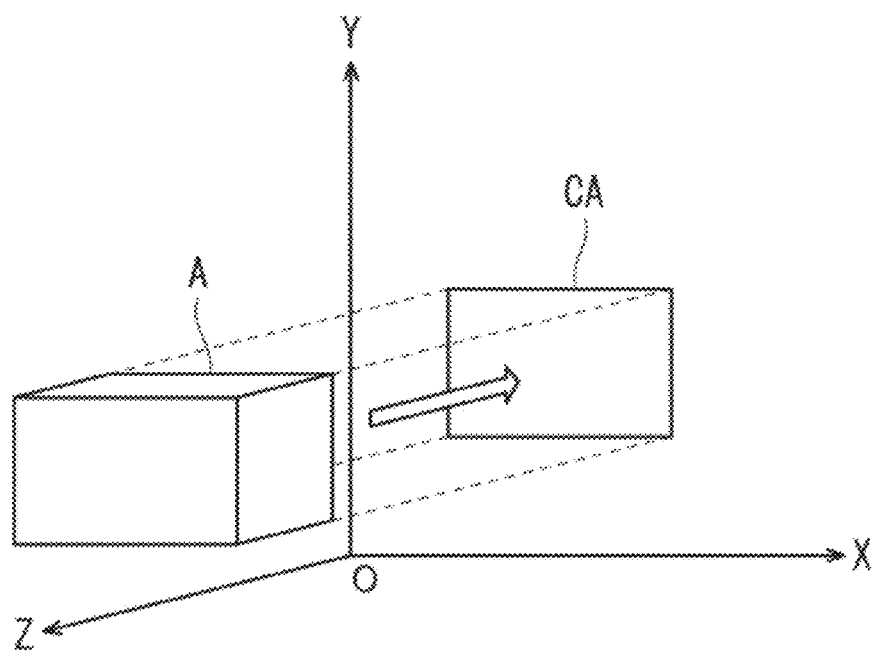
FIG. 9 is a diagram illustrating one example of a contour shape of an article, which is estimated by the image processing module.

As illustrated in FIG. 7, in this embodiment, the article A is a cardboard case in a rectangular parallel-piped shape, and articles A in the same shape are piled up-and-down and left-and-right. Among the angles θa and θb of the estimated plane, the angle θa is substantially 90°, and the angle θb is between 0° and 90°. Further, as illustrated in FIG. 9, the shape of a contour CA of the article A estimated by the contour estimating module 111e is a trapezoid or a rectangular shape. FIG. 9 is a diagram illustrating one example of the shape of the contour CA of the article A, which is estimated by the contour estimating module 111e of the image processing module 111.

The edge extracting module 111f extracts an edge in at least either one of the first image IAa or IAb. The edge extracting module 111f generates an edge image including only the extracted edge, and outputs the generated edge image to the identifying module 111g. The edge image is an image corresponding to the first image IAa or IAb projecting only the edge.

The identifying module 111g identifies the article A in at least either one of the first image IAa or IAb based on the contour shape of the article A estimated by the contour estimating module 111e. In detail, the identifying module 111g compares, on the edge image of the first image IAa or IAb, an edge shape included in the edge image and the contour shape of the article A, and executes pattern matching so as to identify an edge of the article A. Further, the identifying module 111g may identify the position of the article A on the first image IAa or IAb based on a position of the identified edge in the edge image. When contour shapes of the articles A are estimated, the identifying module 111g executes the pattern matching between the contour shapes of the article A and the edge shape. Moreover, when the article A is not entirely projected on the first images IAa and IAb, the identifying module 111g may execute partial pattern matching between a part of the contour shape of the article A and the edge shape so as to identify the edges indicative of the article A. Such pattern matching is a geometric-shape pattern matching, and any existing method may be used.

In the example illustrated in FIG. 9, the edge of the contour CA of the article A projected on the image has a feature of including a corner projecting toward an upper left or upper right direction on the image. Therefore, the identifying module 111g searches an edge projecting to upper left or upper right, and executes the pattern matching with reference to the corner. Accordingly, an amount of processing of the identifying module 111g can be reduced.

The object detecting module 111h detects the 3D position and posture of the article A based on the image of the article A on the first image IAa or IAb identified by the identifying module 111g and the angles of the estimated plane. In detail, the object detecting module 111h acquires the distance value or the 3D position corresponding to the pixel indicative of the article A on the first image IAa or IAb. At this time, the object detecting module 111h uses the distance value or the 3D position of the pixel of the second image IBa or IBb. The object detecting module 111h detects the 3D position of the article A based on the acquired distance value or the 3D position. Further, the object detecting module 111h detects the 3D posture of the article A based on the angles of the estimated plane and the shape of the article A. The object detecting module 111h outputs the detection result to the arm controlling module 112, the hand controlling module 113, and the carrier controlling module 114.

<Operation of Robot System>

Figure 10:
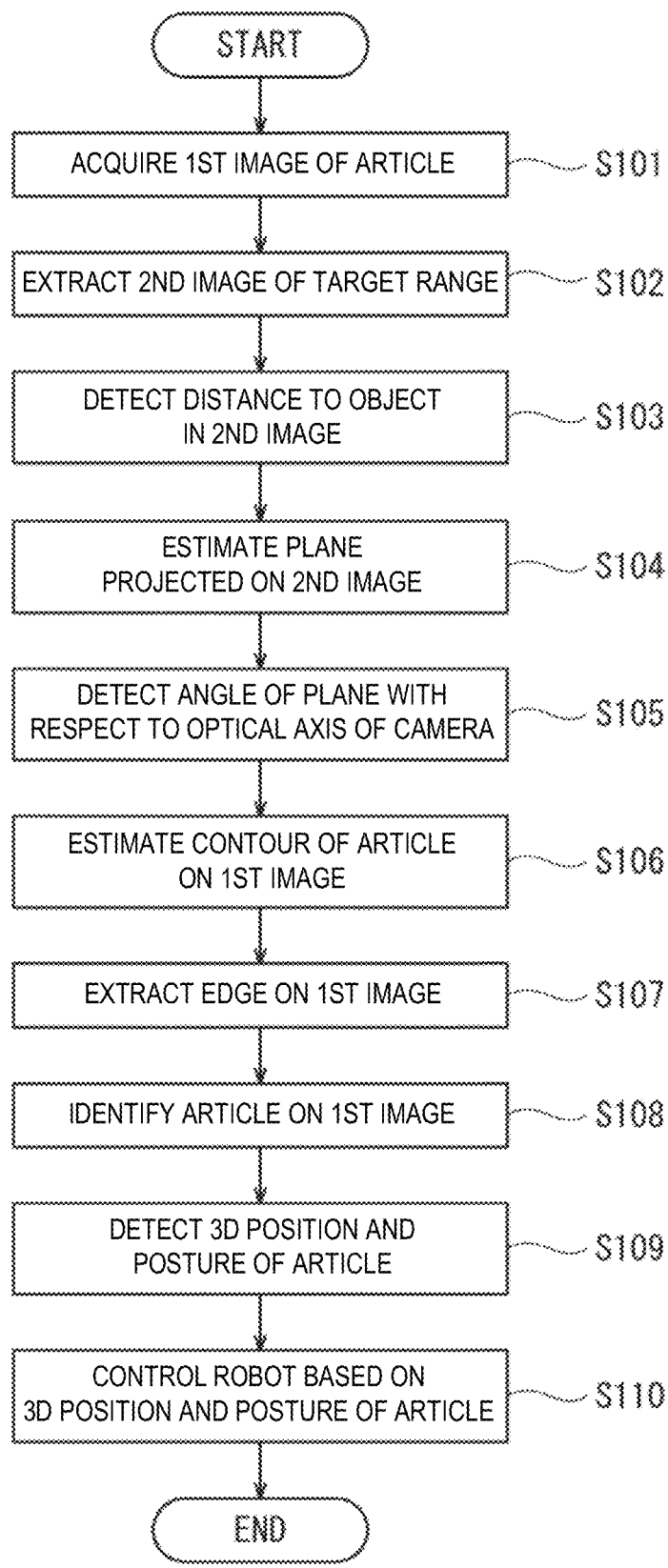
FIG. 10 is a flowchart illustrating one example of operation of the robot system according to this embodiment.

Operation of the robot system 1 according to this embodiment is described. FIG. 10 is a flowchart illustrating one example of the operation of the robot system 1 according to this embodiment. As illustrated in FIG. 10, the imaging controlling module 401 of the controller 100 of the robot system 1 causes the cameras 41a and 41b to capture and acquire the first images IAa and IAb which are the images of the article A to be moved by the robot 10 (hereinafter, may be referred to as an "article A1") (Step S101). For example, the imaging controlling module 401 executes the imaging at a timing when the article A1 enters into the field of view of the cameras 41a and 41b which move accompanying with the operation of the robot 10. In this case, the operator etc., who visually confirms the image(s) of the camera 41a and/or 41b displayed on the output device 30 may determine the timing, and may input a command for the execution of the imaging into the input device 20. Alternatively, a distance sensor (not illustrated) may be provided to the robot hand 13, and when the distance value detected by the distance sensor indicates approach of the robot hand 13 to the article A, the imaging controlling module 401 may execute the imaging.

Note that, at or before Step S101, the operator etc., may input information on the article A1 through the input device 20. The information on the article A1 includes at least information indicative of the shape of the article A1. For example, the operator may input, as the information, a name or a symbol assigned to the shape of the article A1, or may cause the output device 30 to display a list of the shapes of the article, and select the shape of the article A1 from the list. The list may be stored in the memory module 115 of the controller 100 in advance.

Next, the image processing module 111 of the controller 100 identifies the target range TA in the first images IAa and IAb, and extracts the second images IBa and IBb included in the target range TA (Step S102).

Next, the image processing module 111 detects the actual distance from the camera 41 to the object projected on the second images IBa and IBb (Step S103). Although in this example the image processing module 111 detects the distance for all the pixel pairs corresponding to each other between the second images IBa and IBb, the distance may be detected for at least three pixel pairs. Further, the image processing module 111 may generate the distance image based on the second image IBa or IBb.

Next, the image processing module 111 estimates the plane projected on the second images IBa and IBb (Step S104). In this example, the image processing module 111 averages the distance values of the pixels of the second image IBa or IBb, and estimates, based on the averaged distance value of each pixel, the pixel set which projects the plane.

Next, the image processing module 111 detects the angle of the estimated plane with respect to the optical axis of the camera 41 (Step S105). In detail, the image processing module 111 calculates, based on the distance value of each pixel projecting the estimated plane and the directions of the lines of sight from the cameras 41a and 41b to the object projected on the concerned pixel, the 3D position corresponding to the pixel, that is, the 3D position of the estimated plane. Further, the image processing module 111 detects the angles of the estimated plane with respect to the optical axial centers LAa and LAb, based on the 3D position of the estimated plane.

Next, the image processing module 111 estimates, based on the angles of the estimated plane and the shape of the article A1 stored in the memory module 115, the contour of the article A1 projected on the first images IAa and IAb (Step S106). In detail, the image processing module 111 calculates a posture of the article A1 while the angles of the plane of the article A1 with respect to the optical axial centers LAa and LAb match the angles of the estimated plane, and estimates the contour shape of the projection image of the article A1 on the first images IAa and IAb in the calculated posture.

Next, the image processing module 111 extracts the edges on the first image IAa or IAb, and generates the edge image including the extracted edge (Step S107). Further, the image processing module 111 identifies the article A1 on the first image IAa or IAb based on the edge image and the contour shape of the article A1 (Step S108). In detail, the image processing module 111 identifies the edge indicative of the contour shape of the article A1 on the edge image, and identifies the article A1 on the first image IAa or IAb based on the edge position on the edge image.

Next, the image processing module 111 detects the 3D position and posture of the article A1 based on the image of the article A1 on the first image IAa or IAb, and the angle of the estimated plane (Step S109). In detail, the image processing module 111 detects, based on the distance value or the 3D position corresponding to the pixels projecting the article A1 in the second image IBa or IBb, the 3D position of the article A1. The image processing module 111 detects, based on the angles of the estimated plane and the shape of the article A1, the 3D posture of the article A1.

Next, the image processing module 111 outputs the detection result at Step S109 to the arm controlling module 112, the hand controlling module 113, the carrier controlling module 114, etc. The arm controlling module 112, the hand controlling module 113, the carrier controlling module 114, etc., control the operation of the robotic arm 12, the robot hand 13, and the carriage 14 so that the robot hand 13 sucks and moves the article A1 (Step S110).

Through Steps S101-S110, the controller 100 estimates, based on the first images of the article A1 which are captured by the cameras 41a and 41b, the angles between the plane projected on the first image and the optical axis, that is, estimates the posture. The controller 100 estimates the posture of the article A1 projected on the first image based on the posture of the estimated plane, and estimates the contour shape of the article A1 projected on the first image based on the estimated posture. Further, the controller 100 identifies the article A1 on the first image based on the estimated contour shape of the article A1.

<Effects Etc.>

The controller 100 as the image processor according to the embodiment includes the memory module 115 configured to store the shape of the article A as the object to be captured. The controller 100 includes the extracting module 111a configured to extract the second image from the first image, the first image being an image of the article A captured by the camera 41, and the second image being the target range that is a partial area of the first image. The controller 100 includes the distance detecting module 111b configured to process the second image to detect the distances from at least three parts projected within the target range to the camera 41. The controller 100 includes the plane estimating module 111c configured to estimate the plane projected within the target range using the distances based on the at least three parts. The controller 100 includes the angle detecting module 111d configured to detect the angle of the estimated plane with respect to the optical axis of the camera 41. The controller 100 includes the contour estimating module 111e configured to estimate, based on the shape of the article A stored in the memory module 115 and the angle of the estimated plane, the contour of the article A projected on the first image, and the controller 100 includes the identifying module 111g configured to identify the article A on the first image based on the contour of the article A.

According to this configuration, the angle of the estimated plane projected within the target range may indicate the posture of the article A with respect to the optical axis of the camera 41. Based on such an angle of the estimated plane and the shape of the article A, the contour of the article A on the first image can be estimated. Further, based on such a contour, the article A can accurately be identified on the first image, which reduces the processing amount required for identifying the article A. Moreover, since the partial area of the first image is used for the estimation of the plane, the processing amount can be reduced. As a result, the image processing accuracy and speed are improved.

Moreover, the contour estimating module 111e may estimate, as the contour of the article A, the shape deformed from the shape of the article A stored in the memory module 115 corresponding to the angle of the estimated plane. According to this configuration, the estimated contour of the article A indicates the contour of the article A which appears on the first image. For example, when the angle of the estimated plane is not 90° with respect to the optical axis, the estimated plane is displayed to be distorted on the first image. The appearing contour of the article A on the first image can highly accurately show the contour on which the distortion of the estimated plane is reflected.

Moreover, the contour estimating module 111e may estimate the contour of the article A in the first image using the angle of the estimated plane as an angle indicative of a posture of the article A with respect to the optical axis of the camera 41. According to this configuration, the processing amount required for estimating the contour of the article A on the first image can be reduced.

Moreover, the controller 100 may further include the edge extracting module 111f configured to extract an edge from the image, and the identifying module 111g may identify the article A by comparing a shape of the edge with the contour of the article A. According to this configuration, the processing amount required for identifying the article A can be reduced.

Moreover, the controller 100 may further include the object detecting module 111h configured to detect the 3D position and posture of the article A based on the image of the article A identified by the identifying module 111g and the angle of the estimated plane. According to this configuration, the article A can be detected in the 3D space.

The imaging device according to the embodiment includes the camera 41 and the controller 100 configured to process an image captured by the camera 41. According to this configuration, effects similarly to the controller 100 according to the embodiment can be obtained.

Note that the camera 41 may include at least two cameras 41a and 41b, and the extracting module 111a may extract at least two second images from the first images captured by the at least two cameras 41a and 41b, respectively. The distance detecting module 111b may detect, by the stereo vision using the at least two second images, the distances to the camera 41 from the at least three parts which are projected within the target range. According to this configuration, the detection accuracy of the distances to the at least three parts is improved.

The robot 10 according to the embodiment includes the imaging device 40, the robotic arm 12 having the robot hand 13 as the end effector configured to perform processing to an article, and the controller 100 configured to control operations of the robot hand 13 and the robotic arm 12 based on the image of the article A identified by the identifying module 111g. According to this configuration, effects similarly to the imaging device 40 according to the embodiment can be obtained.

Moreover, the imaging device 40 may detect the 3D position and posture of the article A based on the image of the article A identified by the identifying module 111g and the angle of the estimated plane. The controller 100 may control the operations of the robot hand 13 and the robotic arm 12 based on the 3D position and posture of the article A. According to this configuration, the robot 10 can perform operation to the article A using the robot hand 13 and the robotic arm 12, based on the 3D position and posture of the article A which are detected using the image of the article A.

The robot system 1 according to the embodiment includes the robot 10 and the input device 20 as an user interface configured to manipulate the robot 10. According to this configuration, effects similarly to the robot 10 according to the embodiment can be obtained.

(Modification 1)

Modification 1 of the embodiment is described. An image processing module 111A of the controller 100 according to Modification 1 is different from the embodiment described above in that the image processing module 111A includes a size estimating module 111i. Below, Modification 1 is described mainly on points different from the embodiment, and points similar to the embodiment will suitably be omitted.

Figure 11:
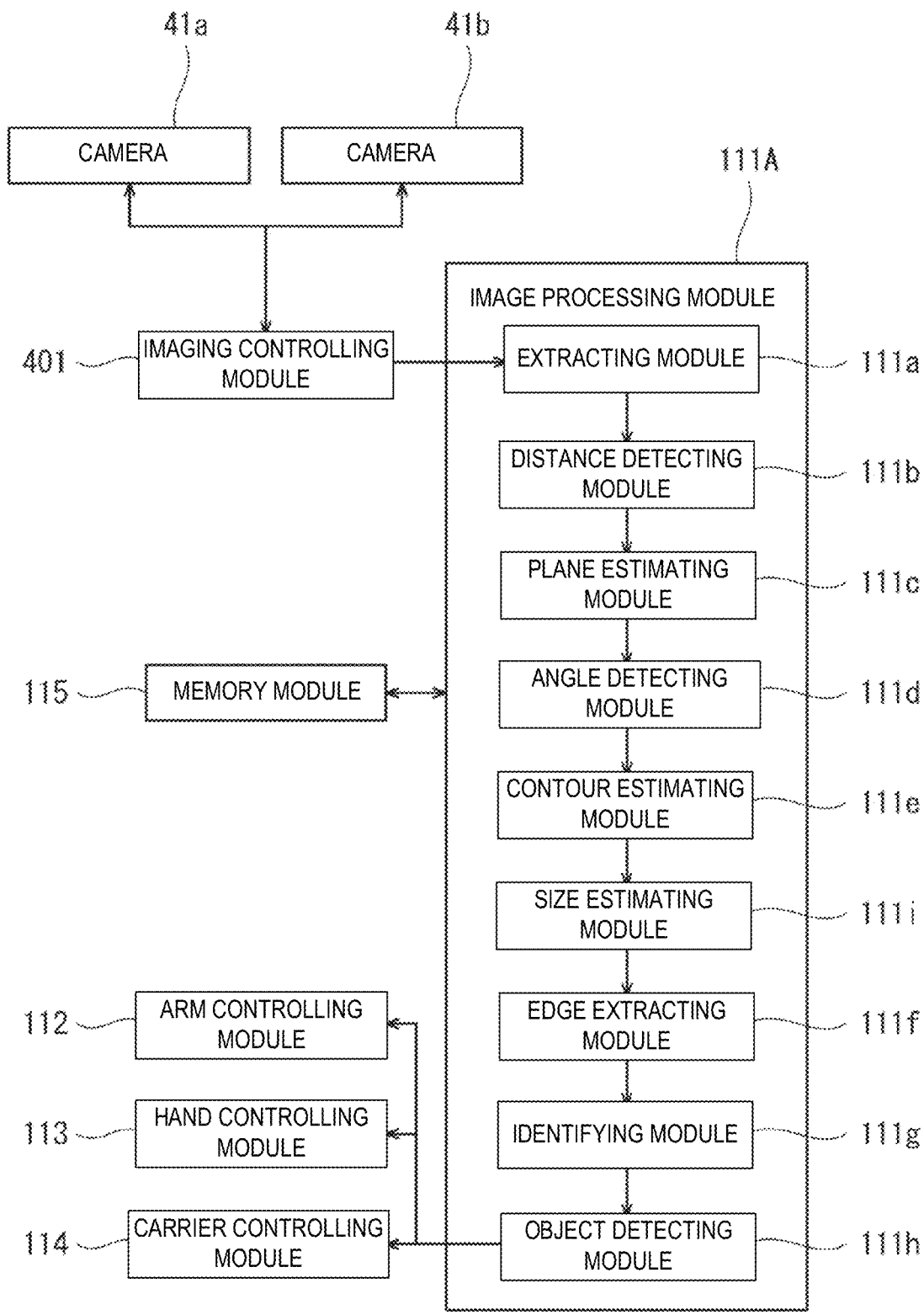
FIG. 11 is a block diagram illustrating one example of a functional configuration of an image processing module according to Modification 1.

FIG. 11 is a block diagram illustrating one example of a functional configuration of the image processing module 111A according to Modification 1. As illustrated in FIG. 11, compared with the image processing module 111 according to the embodiment, the image processing module 111A further includes the size estimating module 111i as a functional component. In this modification, the memory module 115 stores information on the shape and size of the article which may be moved by the robot 10. The size of the article is the actual size of the article.

The size estimating module 111i uses a first size, which is the size of the article stored in the memory module 115, to estimate a second size, which is the size of the article A1 on the first images IAa and IAb. In detail, the distance detecting module 111b detects 3D positions corresponding to at least two pixels on the second image IBa or IBb. The size estimating module 111i compares the 3D positions corresponding to the at least two pixels, with 2D positions of the at least two pixels on the second image IBa or IBb so as to calculate a size ratio between a real image and the image on the second image IBa or IBb. The size estimating module 111i estimates the second size of the article A1 based on the ratio and the first size of the article A1.

Further, the identifying module 111g identifies the article A1 on the first image IAa or IAb based on the contour shape of the article A1 estimated by the contour estimating module 111e, and the second size of the article A1. In detail, the identifying module 111g determines the size of the contour shape of the article A1 to be corresponded to the second size, and based on a contour shape in the determined size or the size therearound, identifies the edge indicative of the article A1 on the edge image of the first image IAa or IAb. The identifying module 111g identifies the position of the article A1 on the first image IAa or IAb based on the edge position on the edge image.

Figure 12:
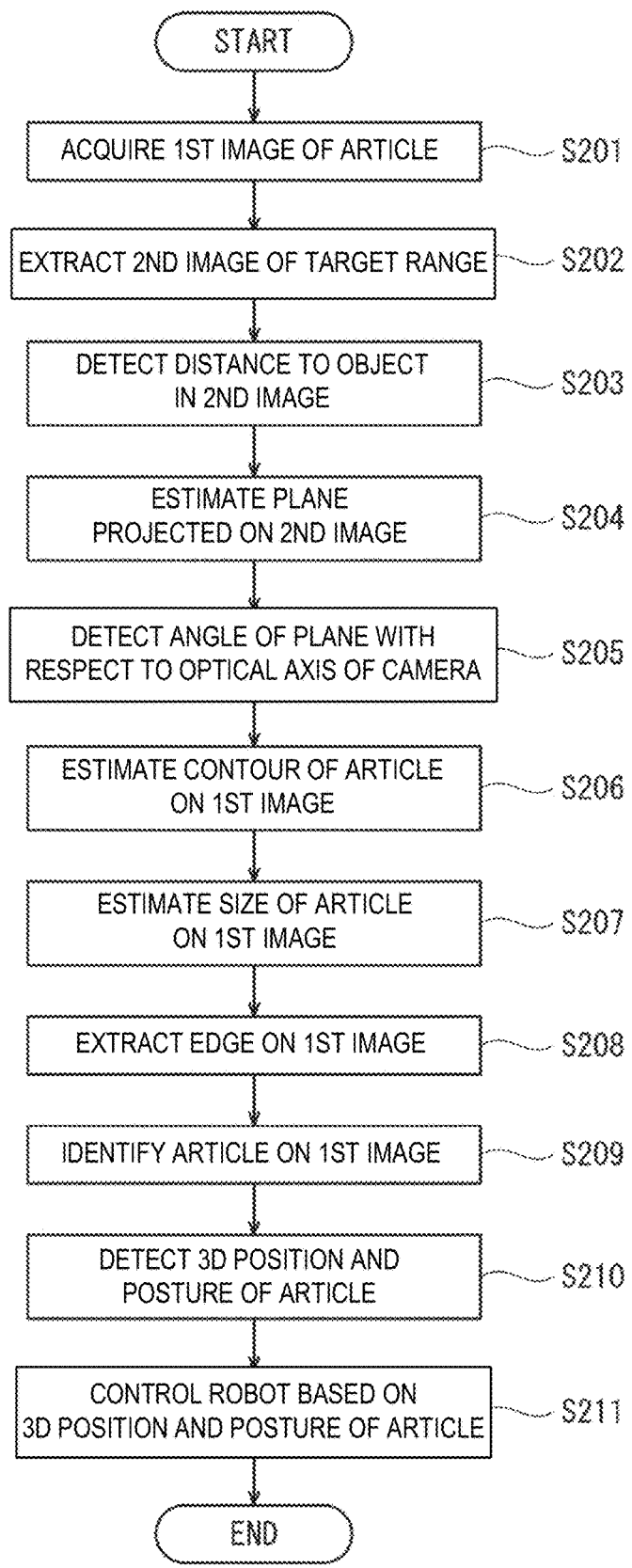
FIG. 12 is a flowchart illustrating one example of operation of a robot system according to Modification 1.

Operation of the robot system 1 according to Modification 1 is described. FIG. 12 is a flowchart illustrating one example of the operation of the robot system 1 according to Modification 1. As illustrated in FIG. 12, processing at Steps S201-S206 is similar to the processing at Steps S101-S106 in the embodiment, respectively. Note that, at or before Step S201, the operator etc., may input, through the input device 20, the information on the article A1 including at least information indicative of the shape and size of the article A1. Further, at Step S203, the image processing module 111A of the controller 100 detects the 3D position corresponding to the pixel pairs, for all the pixel pairs corresponding to each other between the second images IBa and IBb.

At Step S207, the image processing module 111A estimates the second size of the article A1 on the first images IAa and IAb based on the 3D positions corresponding to the pixels of the second images IBa and IBb, the 2D positions of the pixels on the second images IBa and IBb, and the first size of the article A1. Moreover, processing at Steps S208, S210, and S211 is similar to the processing at Steps S107, S109, and S110 in the embodiment, respectively.

At Step S209, the image processing module 111A identifies the article A1 on the first image IAa or IAb based on the contour shape and the second size of the article A1.

According to Modification 1 as described above, effects similarly to the embodiment can be obtained. The image processing module 111A according to Modification 1 may be provided with the size estimating module 111i which estimates the second size, which is the size of the article A on the image capture by the camera 41. The memory module 115 may store the first size which is the actual size of the article A. The distance detecting module 111b may use the distance at a part projected within the target range to detect the 3D position at the part. Further, the size estimating module 111i may estimate the second size based on the 3D position at the part, the 2D position at the part on the image captured by the camera 41, and the first size. The identifying module 111g may identify the article A based on the contour and the second size of the article A. According to this configuration, the article A is identified on the image based on the contour of the article A and the size of the article A on the image. Therefore, the identification accuracy of the article A improves, and the processing amount required for identifying the article A can be reduced.

(Modification 2)

Modification 2 of the embodiment is described. An image processing module 111B of the controller 100 according to Modification 2 is different from the embodiment in that the image processing module 111B includes a direction determining module 111j. Below, Modification 2 is described mainly on points different from the embodiment and Modification 1, and points similar to the embodiment and Modification 1 will suitably be omitted.

Figure 13:
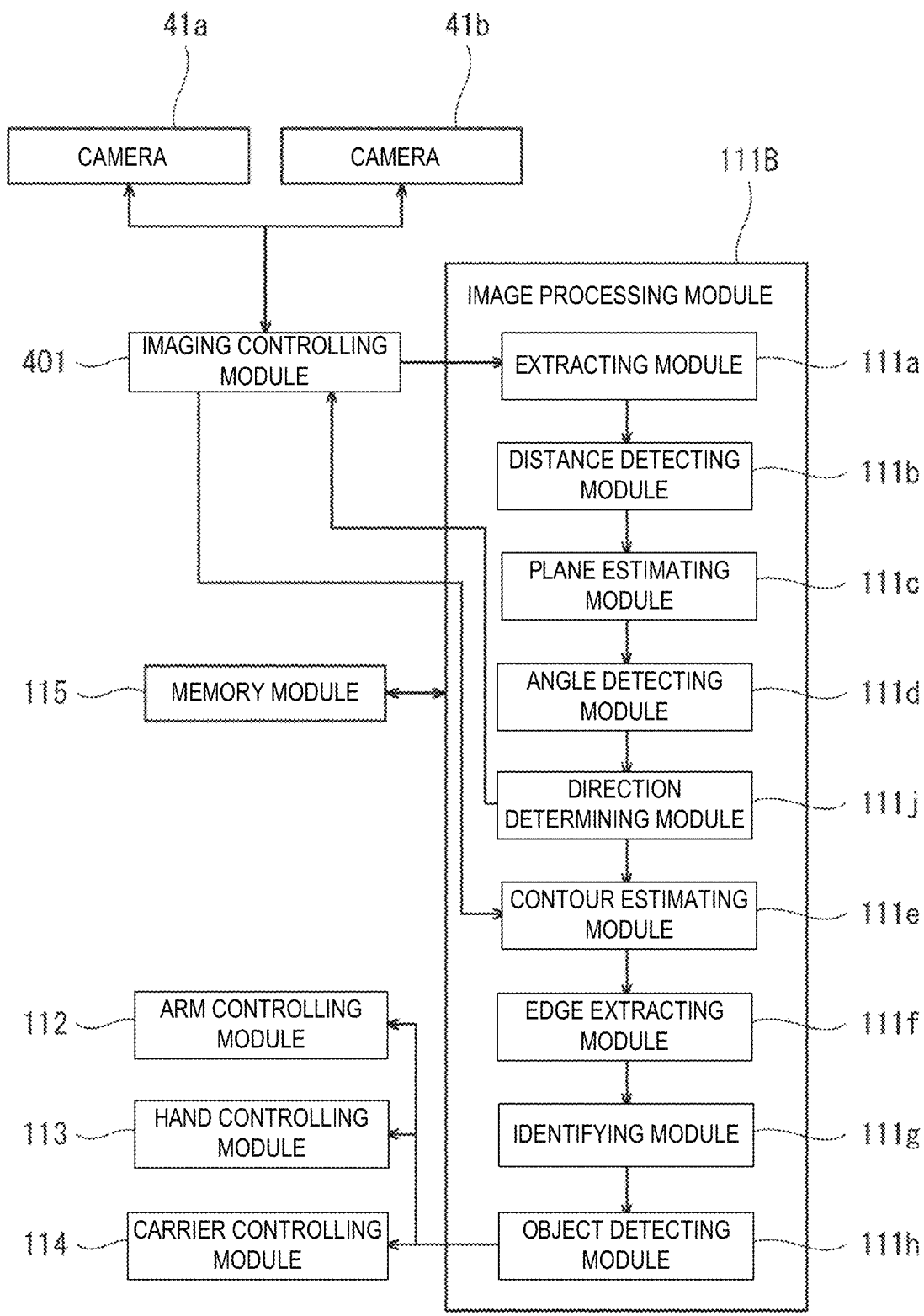
FIG. 13 is a block diagram illustrating one example of a functional configuration of an image processing module according to Modification 2.

FIG. 13 is a block diagram illustrating one example of a functional configuration of the image processing module 111B according to Modification 2. As illustrated in FIG. 13, compared with the image processing module 111 according to the embodiment, the image processing module 111B further includes the direction determining module 111j as a functional component.

The direction determining module 111j orients the camera 41 so that the direction of the optical axis of the camera 41 matches a first direction perpendicular to the estimated plane which is estimated by the plane estimating module 111c. In detail, the direction determining module 111j determines the directions of the optical axial centers LAa and LAb of the cameras 41a and 41b to be the first direction perpendicular to the estimated plane. Further, the direction determining module 111j outputs to the imaging controlling module 401 a command to orient the cameras 41a and 41b such that the directions of the optical axial centers LAa and LAb match the first direction, and a command to cause the oriented cameras 41a and 41b to carry out the imaging. After the orientation of the cameras 41a and 41b, they are directed to the article A1 and the optical axial centers LAa and LAb are perpendicular to the estimated plane.

The imaging controlling module 401 may orient the cameras 41a and 41b to a desired direction by outputting a command to the arm controlling module 112 so as to operate the robotic arm 12. Alternatively, the camera 41 may be provided to the robotic arm 12 via a gimbal (not illustrated) which can arbitrarily change the direction of the camera 41, and the imaging controlling module 401 may control operation of the gimbal so as to orient the cameras 41a and 41b to a desired direction. After the orientation, the imaging controlling module 401 causes the cameras 41a and 41b to capture a third image which is an image of the article A1, and outputs the third image to the contour estimating module 111e. The imaging controlling module 401 may store the third image in the memory module 115.

The contour estimating module 111e estimates the contour of the article A1 projected on the third image based on the shape of the article A1 stored in the memory module 115. The contour estimating module 111e calculates the posture of the article A1 while the plane of the article A1 is perpendicular to the optical axial centers LAa and LAb. Further, the contour estimating module 111e calculates, based on the shape of the article A1, the contour shape of the projection image of the article A1 taking the calculated posture on the XY plane in the camera coordinate system. The number of contour shapes which may be calculated is smaller when the plane of the article A1 is perpendicular to the optical axial centers LAa and LAb, compared with when it is not perpendicular. Therefore, the processing amount of the identifying module 111g may be reduced.

Figure 14:
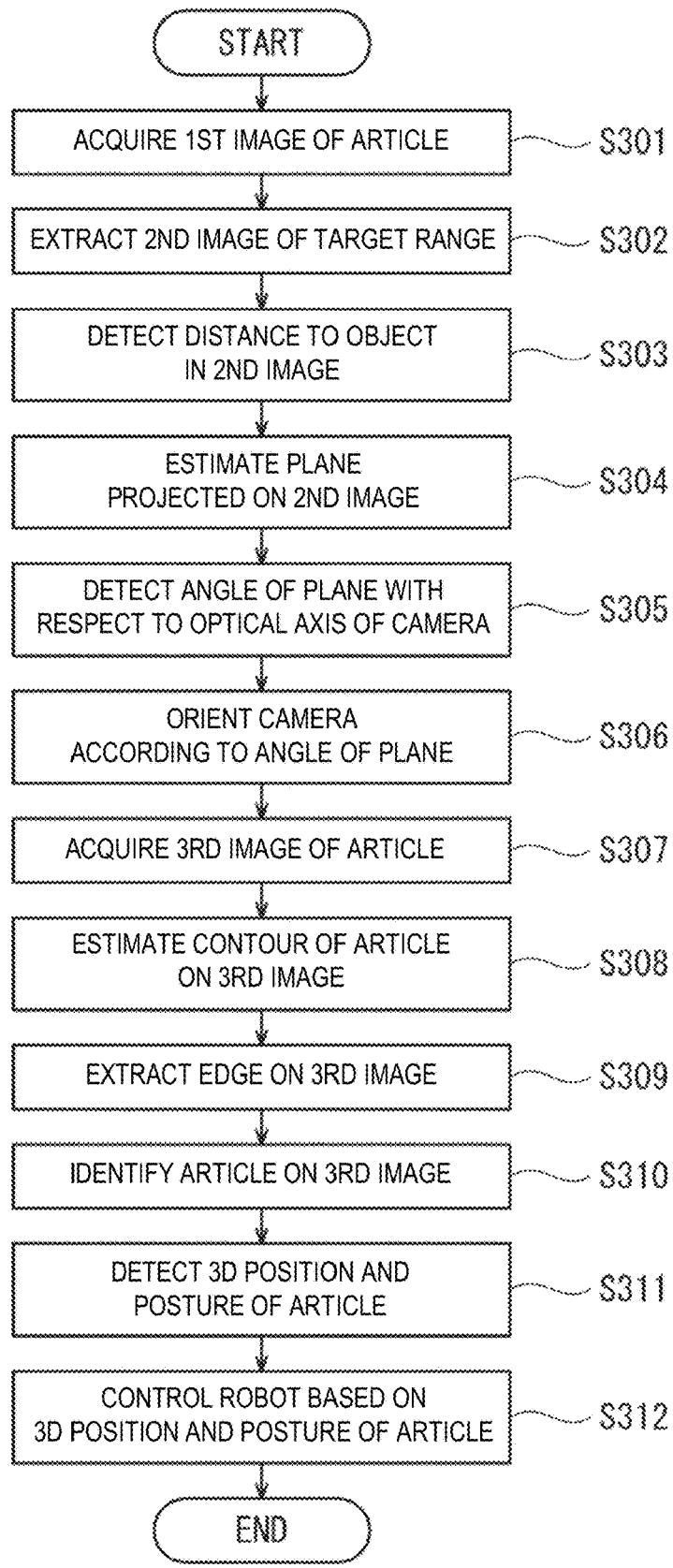
FIG. 14 is a flowchart illustrating one example of operation of a robot system according to Modification 2.

Operation of the robot system 1 according to Modification 2 is described. FIG. 14 is a flowchart illustrating one example of the operation of the robot system 1 according to Modification 2. As illustrated in FIG. 14, processing at Steps S301-S305 is similar to the processing at Steps S101-S105 in the embodiment, respectively.

At Step S306, the image processing module 111B of the controller 100 orients the camera 41 according to the angles of the estimated plane, which are estimated at Step S305. In detail, the image processing module 111B outputs to the imaging controlling module 401 the command to orient the cameras 41a and 41b such that the directions of the optical axial centers LAa and LAb of the cameras 41a and 41b become perpendicular to the estimated plane. In this example, the imaging controlling module 401 orients the cameras 41a and 41b to the direction described above by outputting the command to the arm controlling module 112 to operate the robotic arm 12. Next, the imaging controlling module 401 causes the oriented cameras 41a and 41b to image the article A1, and acquires the third image including the article A1 (Step S307).

Next, the image processing module 111B estimates the contour of the article A1 on the third image (Step S308). In detail, the image processing module 111B estimates the contour shape of the projection image of the article A1 on the third image while the plane of the article A1 is perpendicular to the optical axial centers LAa and LAb. In this example, the contour shape of the article A1 is rectangular. Then, the image processing module 111B extracts an edge on the third image so as to generate an edge image (Step S309). Further, the image processing module 111B identifies the article A1 on the third image based on the edge image and the contour shape of the article A1 (Step S310).

Next, the image processing module 111B detects the 3D position and posture of the article A1 based on the image of the article A1 on the third image (Step S311). In detail, similarly to the case of the second image, the image processing module 111B detects, by the stereo vision using the two third images of the cameras 41a and 41b, the 3D position and posture of the article A1. Further, processing at Step S312 is similar to Step S110 in the embodiment.

According to Modification 2 as described above, effects similarly to the embodiment can be obtained. The image processing module 111B according to Modification 2 may be provided with the direction determining module 111j which orients the camera 41 so that the direction of the optical axis of the camera 41 matches the first direction perpendicular to the estimated plane which is estimated by the plane estimating module 111c. The contour estimating module 111e may estimate, based on the shape of the article A stored in the memory module 115, the contour of the article A projected on the third image. The third image is an image of the article A captured by the camera 41 of which the optical axis is oriented to the first direction. According to this configuration, the camera 41 is oriented such that its optical axis direction becomes the first direction perpendicular to the estimated plane and the plane of the article A. The contour of the article A on the third image which is captured by the camera 41 as described above indicates the contour when the plane of the article A is seen from front. Therefore, the estimating accuracy of the contour of the article A improves, and the processing amount required for the estimation can be reduced.

(Modification 3)

Modification 3 of the embodiment is described. An image processing module 111C of the controller 100 according to Modification 3 is different from Modification 2 in that the image processing module 111C includes the size estimating module 111i. Below, Modification 3 is described mainly on points different from the embodiment and Modifications 1 and 2, and points similar to the embodiment and Modifications 1 and 2 will suitably be omitted.

Figure 15:
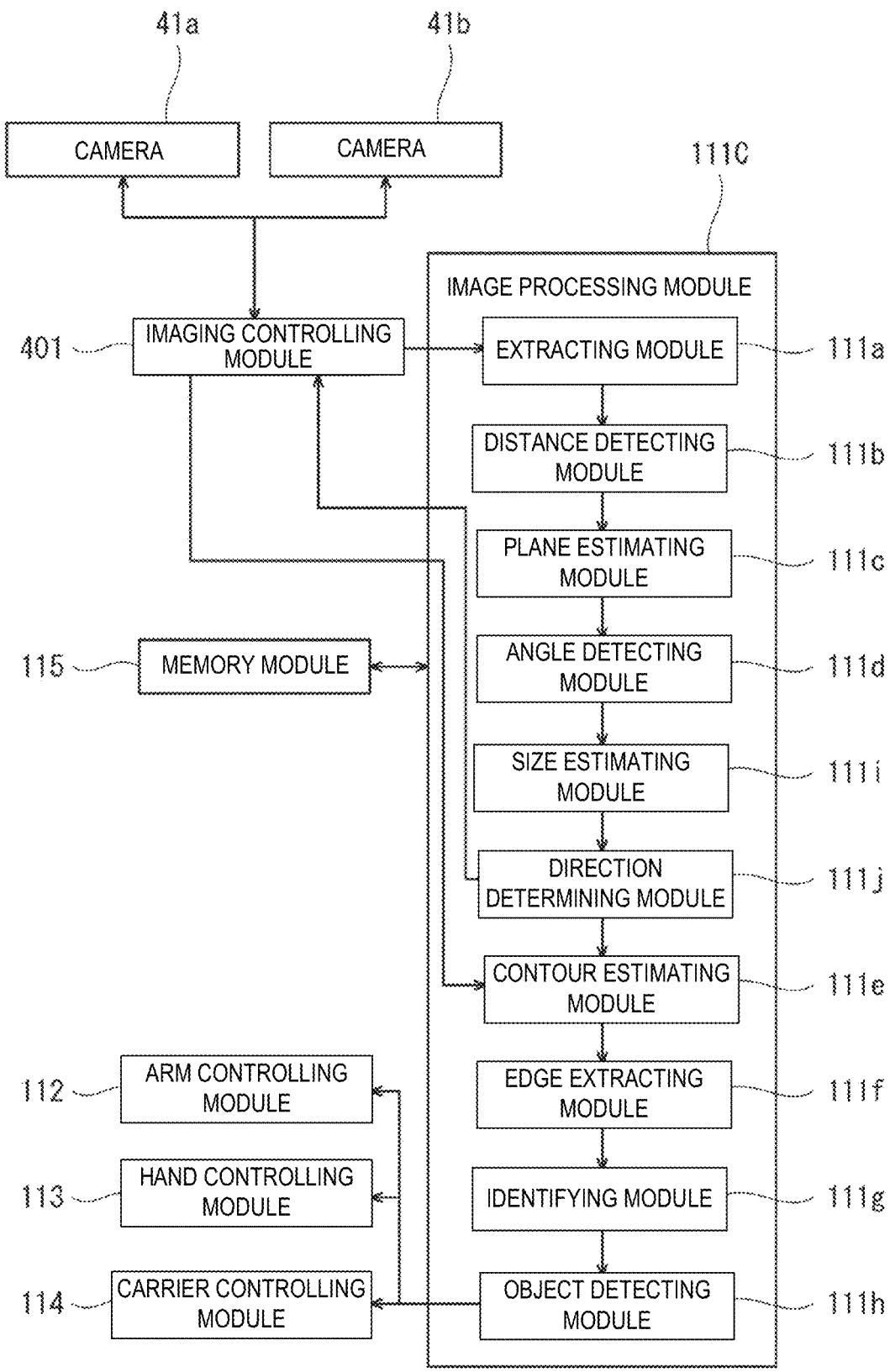
FIG. 15 is a block diagram illustrating one example of a functional configuration of an image processing module according to Modification 3.

FIG. 15 is a block diagram illustrating one example of a functional configuration of the image processing module 111C according to Modification 3. As illustrated in FIG. 15, compared with the image processing module 111B according to Modification 2, the image processing module 111C further includes the size estimating module 111i as a functional component. A configuration of the size estimating module 111i is similarly to Modification 1.

Figure 16:
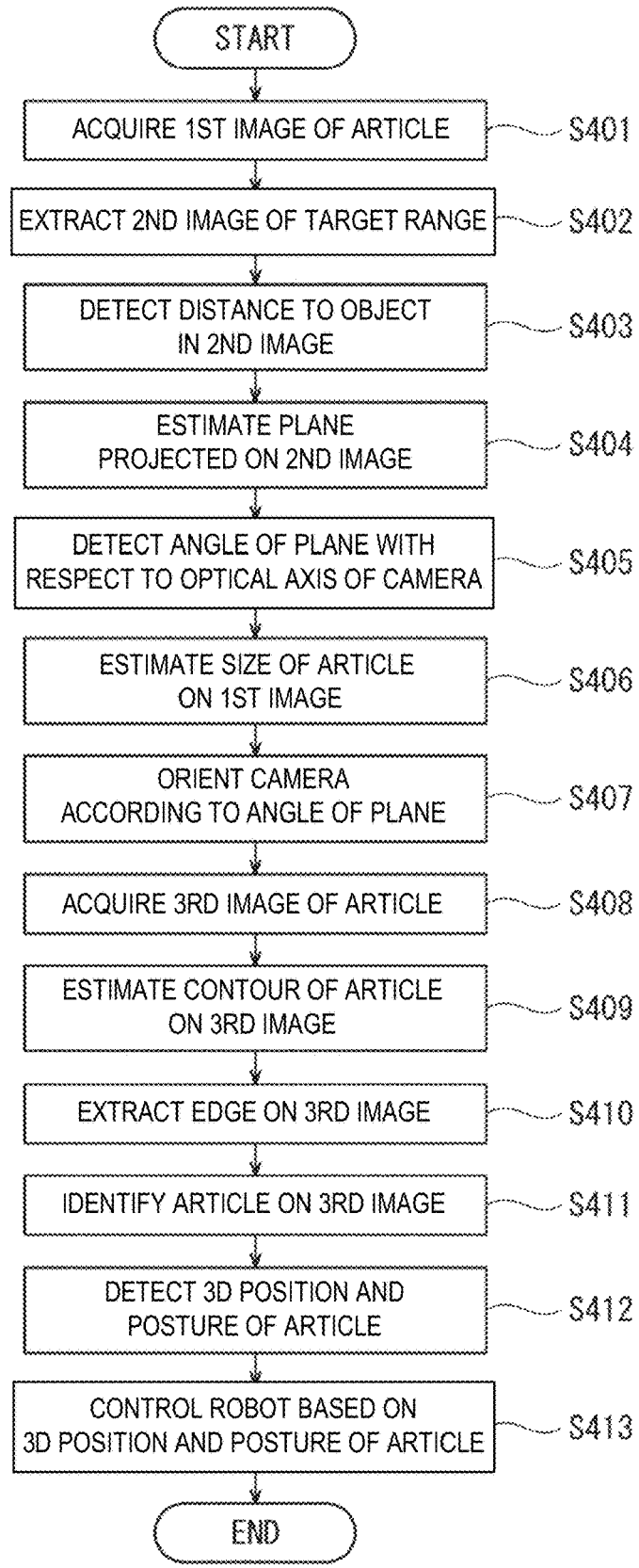
FIG. 16 is a flowchart illustrating one example of operation of a robot system according to Modification 3.

Operation of the robot system 1 according to Modification 3 is described. FIG. 16 is a flowchart illustrating one example of the operation of the robot system 1 according to Modification 3. As illustrated in FIG. 16, processing at Steps S401-S405 is similar to the processing at Steps S301-S305 in Modification 2, respectively. Processing at Step S406 is similar to the processing at Step S207, and processing at Steps S407-S410 is similar to the processing at Steps S306-S309 in Modification 2, respectively.

At Step S411, the image processing module 111C of the controller 100 identifies the article A1 on the third image based on the contour shape of the article A1 on the third image which is estimated at Step S409, and the second size of the article A1 on the first image which is estimated at Step S406. In detail, the image processing module 111C determines the size of the contour shape of the article A1 to be corresponded to the second size, and based on the contour shape of the article A in the determined size or the size therearound, identifies the edge indicative of the article A1 on the edge image of the third image. The image processing module 111C identifies the position of the article A1 on the third image based on the edge position on the edge image. Further, processing at Steps S412 and S413 is similar to the processing at Steps S311 and S312 in Modification 2, respectively. Therefore, according to Modification 3 as described above, effects similarly to Modifications 1 and 2 can be obtained.

(Modification 4)

Modification 4 of the embodiment is described. An image processing module 111D of the controller 100 according to Modification 4 is different from the embodiment in that the image processing module 111D includes a surface range extracting module 111k. Below, Modification 4 is described mainly on points different from the embodiment and Modifications 1-3, and points similar to the embodiment and Modifications 1-3 will suitably be omitted.

Figure 17:
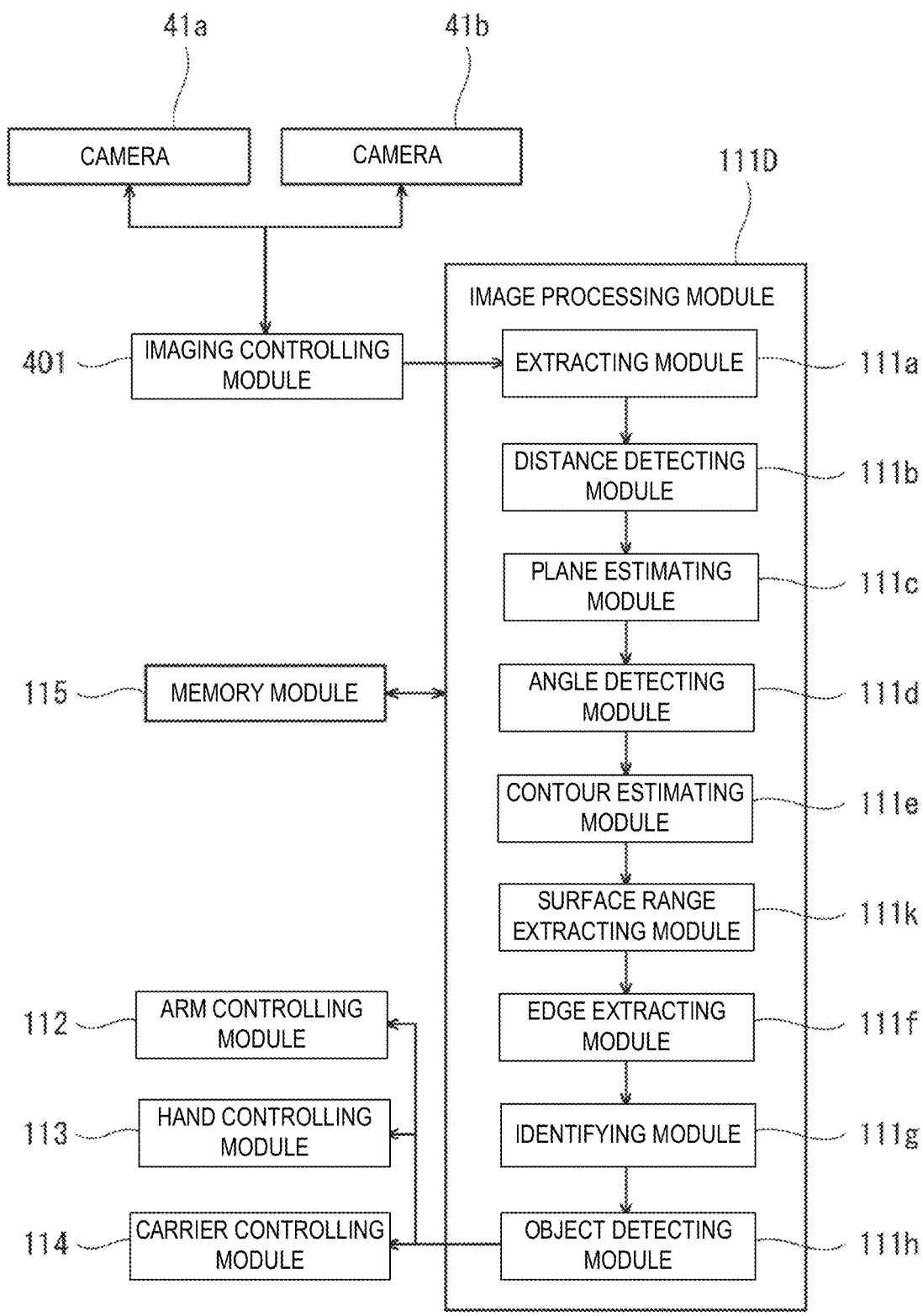
FIG. 17 is a block diagram illustrating one example of a functional configuration of an image processing module according to Modification 4.

FIG. 17 is a block diagram illustrating one example of a functional configuration of the image processing module 111D according to Modification 4. As illustrated in FIG. 17, compared with the image processing module 111 according to the embodiment, the image processing module 111D further includes the surface range extracting module 111k as a functional component. In this modification, the memory module 115 stores information on a surface state of the target article which may be moved by the robot 10. The surface state information of the article is about surface elements indicating the surface state, such as a color and texture of the article surface.

The surface range extracting module 111k extracts, on the image, a surface range showing an image corresponding to the surface state of the article A1 as a target article. In detail, the surface range extracting module 111k extracts the surface range showing the image of a state similar to the surface state of the article A1.

For example, the surface range extracting module 111k extracts a surface range indicating a color similar to the surface color of the article A1. In this case, the surface range extracting module 111k serially scans pixels within the image, and extracts, as an extracted pixel, a pixel at a luminance value indicating a color the same as or similar to the surface color of the article A1. Further, the surface range extracting module 111k extracts a range formed by a set of adjacent extracted pixels as the surface range. For example, the surface range extracting module 111k may regard, as the surface range, a range including more than a given number of extracted pixels. The given number may be determined according to the configuration of the article A1, the distance from the camera 41 to the article A1, etc.

For example, the surface range extracting module 111k extracts the surface range indicating a texture similar to the surface texture of the article A1. In this case, the surface range extracting module 111k extracts a range indicating a texture feature the same as or similar to the texture feature of the surface of the article A1. In detail, the surface range extracting module 111k moves a scanning frame to scan the entire image, and detects the texture feature formed by the pixel within the scanning frame at each detection position during the scanning. The detection positions may be disposed such that the whole scanning frames at all the detection positions cover the entire image. For example, the detection positions may be disposed such that the scanning frames at adjacent detection positions become adjacent to or partially overlapping with each other.

The surface range extracting module 111k compares the texture feature of the surface of the article A1 stored in the memory module 115, and the texture feature within the scanning frame at each detection position, and determines whether the textures are the same as, or similar or dissimilar to each other. The surface range extracting module 111k regards, as the surface range, a range within the scanning frame at the detection position where the texture is the same or similar. The size of the scanning frame may be the size including more than a given number of pixels which can be considered as the surface range.

The surface range extracting module 111k may determine, as the surface range, a range where at least one surface element such as the color and the texture is the same as or similar to the surface state of the target article A1.

Further, the identifying module 111g identifies the article A1 on the first image IAa or IAb based on the contour shape of the article A1 estimated by the contour estimating module 111e, and the surface range extracted by the surface range extracting module 111k. In detail, the identifying module 111g identifies the surface range on the edge image of the first image IAa or IAb based on pixel coordinates of the pixels constituting the surface range. Further, the identifying module 111g extracts an edge near the surface range on the edge image. The edge near the surface range may include an edge overlapping with the surface range, an edge adjacent to the surface range, an edge within a given distance from the surface range, and an edge surrounding at least a part of the surface range. The identifying module 111g executes pattern matching by comparing the shape of the extracted edge and the contour shape of the article A1 so as to identify the edge indicative of the article A1. The identifying module 111g identifies the position of the article A1 on the first image IAa or IAb based on the position of the edge on the edge image.

Figure 18:
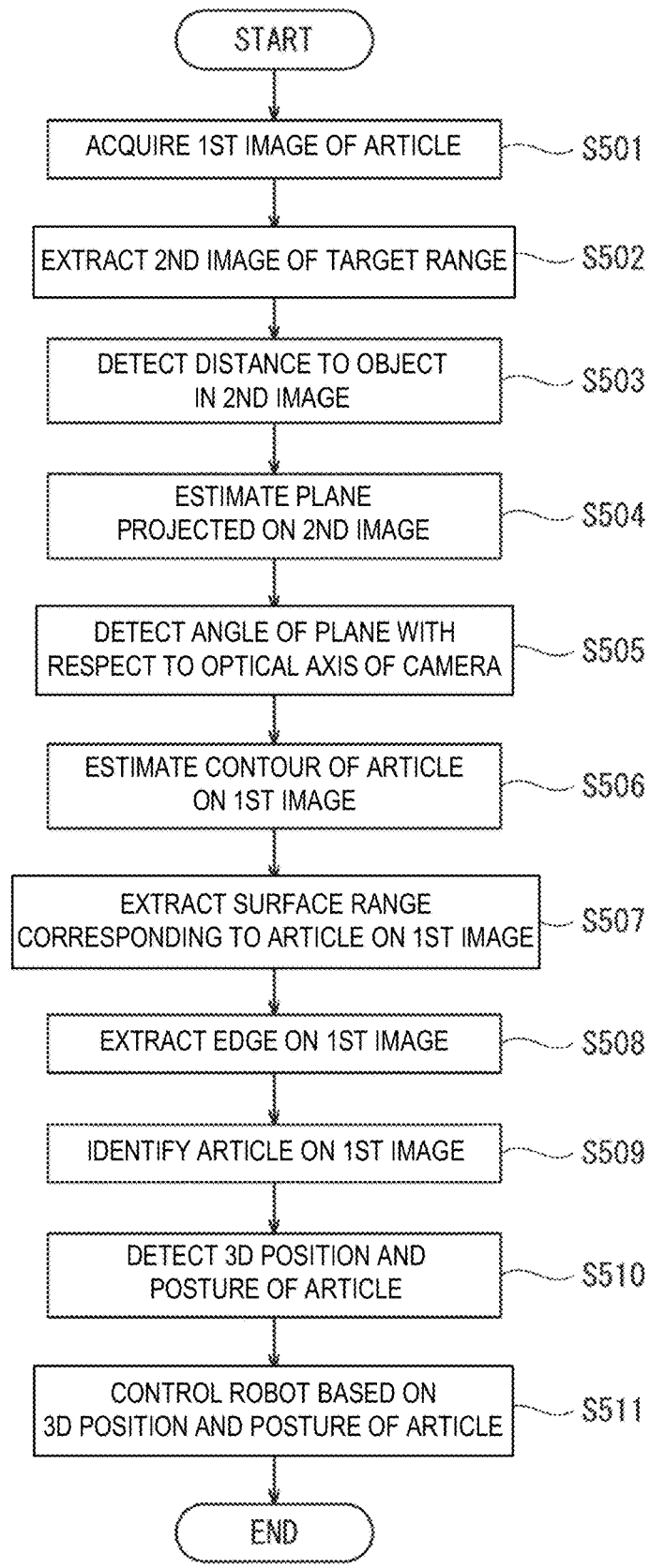
FIG. 18 is a flowchart illustrating one example of operation of a robot system according to Modification 4.

Operation of the robot system 1 according to Modification 4 is described. FIG. 18 is a flowchart illustrating one example of the operation of the robot system 1 according to Modification 4. As illustrated in FIG. 18, processing at Steps S501-S506 is similar to the processing at Steps S101-S106 in the embodiment, respectively.

At Step S507, the image processing module 111D of the controller 100 extracts the surface range projecting the image corresponding to the surface state of the article A1 on the first image IAa or IAb. Next, at Step S508, the image processing module 111D generates the edge image of the first image IAa or IAb. Next, at Step S509, the image processing module 111D identifies the article A1 on the first image IAa or IAb based on the edge image, the contour shape of the article A1, and the information on the surface range corresponding to the surface state of the article A1. Further, processing at Steps S510 and S511 is similar to the processing at Steps S109 and S110 in the embodiment, respectively.

According to Modification 4 as described above, effects similarly to the embodiment can be obtained. The image processing module 111D according to Modification 4 may be provided with the surface range extracting module 111k which extracts, on the image captured by the camera 41, the surface range corresponding to the surface state of the article A. The surface range extracting module 111k may extract the surface range based on the information on the surface state stored in the memory module 115, and the identifying module 111g may identify the article A based on the contour and the surface range of the article A. According to this configuration, the article A is identified on the image based on the contour of the article A and the surface range corresponding to the article A. Therefore, the identifying accuracy of the article A improves. Note that the processing using the surface range extracting module 111k of the image processing module 111D may be applied to Modifications 1-3.

(Modification 5)

Modification 5 of the embodiment is described. An image processing module 111E of the controller 100 according to Modification 5 is different from the embodiment in that the image processing module 111E is configured to search another article in the image. Below, Modification 5 is described mainly on points different from the embodiment and Modifications 1-4, and points similar to the embodiment and Modifications 1-4 will suitably be omitted.

Figure 19:
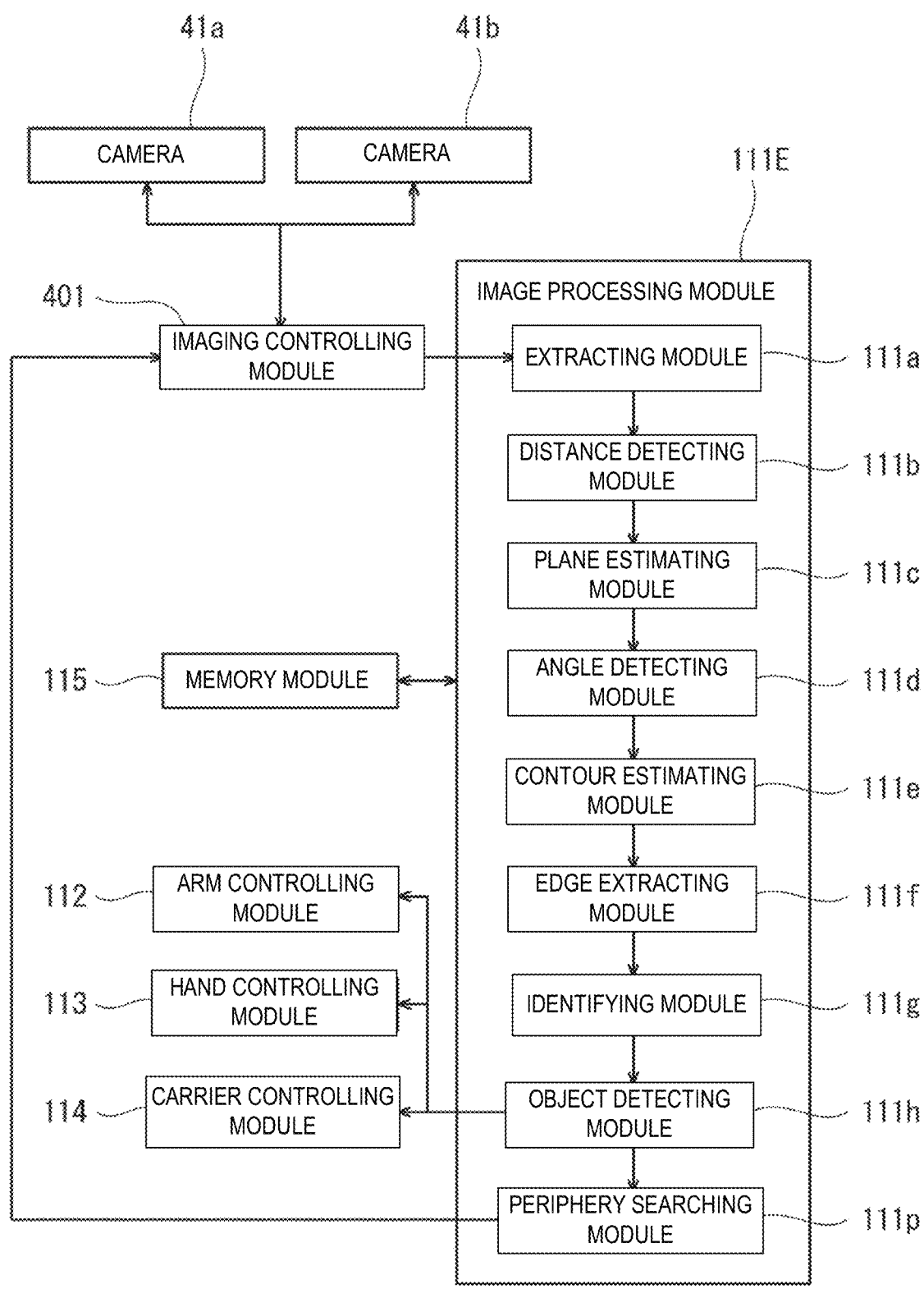
FIG. 19 is a block diagram illustrating one example of a functional configuration of an image processing module according to Modification 5.

FIG. 19 is a block diagram illustrating one example of a functional configuration of the image processing module 111E according to Modification 5. As illustrated in FIG. 19, compared with the image processing module 111 according to the embodiment, the image processing module 111E further includes a periphery searching module 111p as a functional component.

The periphery searching module 111p searches, in at least one of the first images IAa and IAb, around the image of the article A1 which is identified by the identifying module 111g so as to detect an image of another article A similar to the article A1. In detail, the periphery searching module 111p executes pattern matching by comparing, on the edge image of the first image IAa or IAb, the shape of the edge around the image of the article A1, and the contour shape of the article A1 estimated by the contour estimating module 111e so as to identify the edge indicative of the another article A. In this embodiment, the periphery searching module 111p identifies the edge of the another article A by, but not limited to, regarding that the plane posture of the article A1 is similar to a plane posture of the another article A.

For example, as illustrated in the first images IAa and IAb in FIG. 7, an article A which is entirely projected, and an article A which is partially projected may exist around the article A1 projected in the target range TA. Therefore, the periphery searching module 111p executes the pattern matching for the entire shape and the partial shape.

The periphery searching module 111p identifies the position of the another article A on the first images IAa and IAb based on the identified position of the edge of the another article A. Further, the periphery searching module 111p outputs to the imaging controlling module 401 positional information of the another article A on the first images IAa and IAb. The positional information of the article A is information indicative of positions of specific parts of the article A that are example the center, the corner, and the sides, and may be represented by pixel coordinates. When the periphery searching module 111p detects articles A, it may output the positional information of one article A, or two or more articles A. For example, when the periphery searching module 111p outputs the positional information of one article A, it may determine the article A closest to the article A1 as an output target, or may determine the output target article A according to an predetermined order in which the articles are moved, for example, in the up-and-down direction or the left-and-right direction.

After the robot 10 moves the article A1, the imaging controlling module 401 orients the cameras 41a and 41b such that the article A, which is the target of the positional information received from the periphery searching module 111p, is located at the center in the image, and causes the cameras 41a and 41b to image the article A. In such an image captured by the cameras 41a and 41b, the article A may be projected on the target range TA, and receive the processing by the image processing module 111E.

According to Modification 5 as described above, effects similarly to the embodiment can be obtained. The image processing module 111E according to Modification 5 is provided with the periphery searching module 111p which searches, on the first image, around the article A1 identified by the identifying module 111g. Moreover, the periphery searching module 111p searches another article A similar to the article A1 based on the contour of the article A1 estimated by the contour estimating module 111e, and detects the position of the another article A on the first image. According to this configuration, the image processing module 111E can detect, on the first image, the image and the position of the article A similar to the article A1. The imaging controlling module 401 can cause the camera 41 to image the article A as the target to be moved subsequent to the article A1, based on the position of the article A. Furthermore, the image processing module 111E uses the contour of the article A1, which is estimated by the contour estimating module 111e, when executing the searching, thus the processing amount of the image processing module 111E being reduced. Note that the processing using the periphery searching module 111p of the image processing module 111E may be applied to Modifications 1-4.

Other Embodiments

Although the examples of the embodiment according to the present disclosure are described above, the present disclosure is not limited to the above embodiment and modifications. That is, the present disclosure may be variously changed or improved within a scope of the present disclosure. For example, the scope of the present disclosure includes modes in which various changes are applied to the embodiment and modifications described above, and modes in which the components of different embodiments and modifications are combined.

For example, although in the embodiment and modifications described above the camera 41 includes the compound-eye camera, particularly a stereo camera, it is not limited to this configuration. For example, the camera 41 may have a configuration including a monocular camera, a ToF (Time-of-Flight) camera, a patterned light projection camera such as a stripe projection camera, or a camera using a light-section method. For example, when the camera 41 includes the monocular camera, the camera 41 may further include a range finder that is for example a laser or a Lidar. In this case, the image processing module may detect a distance between a position of an irradiation target of a light ray and the camera 41, and a 3D position of the irradiation target of the light ray, based on a position of the light ray of the range finder within a camera image, and a measurement result of the range finder. Alternatively, when the camera 41 does not include the range finder, the image processing module may detect, based on a change in, for example, the shape and size of the object which is projected on the camera image accompanying with a change in an imaging position of the monocular camera, the distance between the camera 41 and the object, and the 3D position of the object.

Further, in the robot system 1 according to the embodiment and the modifications, the number and configuration of the input device 20 and the robot 10 may be any number and configuration. For example, the robot system 1 may be provided with one or more input device(s) 20 and one or more robot(s) 10. Moreover, the robot 10 may be provided with one or more robotic arm(s) 12. Further, the robot 10 is not limited to a vertical articulated industrial robot, but may be an industrial robot of, for example, a horizontal articulated type, a polar coordinate type, a cylindrical coordinate type, a Cartesian coordinate type, or other types. Moreover, the robot 10 is not limited to the industrial robot, and may be, for example, a service robot, construction machinery, a crane, a cargo vehicle, or a humanoid. The service robot is a robot used in various service industries, such as nursing, medical science, cleaning, guard, guidance, rescue, cooking, and goods offering.

Further, all the numbers, such as the ordinal number and the quantity, used in the above are to illustrate in order to concretely describe the art of the present disclosure, and therefore, the present disclosure is not limited to the illustrated numbers. Moreover, the relations of connection between the components, and the order of the steps are to illustrate in order to concretely describe the art of the present disclosure, and therefore, the relations of connection between the components, and the order of the steps which realize the functions of the present disclosure are not limited to those described in the embodiment and the modifications, but are changeable or replaceable.

Further, the division of the block in the functional block diagram is one example, and therefore, blocks may be realized as one block, one block may be divided into blocks, and/or a part of the functions may be transferred to other blocks. Moreover, the functions of blocks having similar functions may be processed by sole hardware or software in a parallel or time-dividing manner.

What is claimed is:

1. A robot, comprising:
   a first arm;
   a second arm connected to the first arm;
   a hand mounted at an end of the second arm, wherein the hand includes a support plate and a back part which is oriented perpendicular to the support plate, and the support plate extends along a rotary twist axis;
   a camera mounted on the second arm between the first arm and the hand, wherein an optical axis of the camera is in a plane of the support plate, the camera is positioned and oriented to have a field of view of an area forward of the hand and so that the optical axis of the camera is parallel to the rotary twist axis, and the camera is configured to capture a first image of the area; and
   an image processor including:
      a memory configured to store information about a shape of an object, the information including any of physical dimensions of the object, two-dimensional or three-dimensional shapes of the object and a contour shape of the object;
      extracting circuitry configured to extract a second image from the first image, the second image being of a target range that is a partial area of the first image;
      distance detecting circuitry configured to process the second image to detect distances from at least three parts projected within the target range to the camera;
      plane estimating circuitry configured to estimate a plane projected within the target range using the distances based on the at least three parts;
      angle detecting circuitry configured to detect an angle of the plane with respect to the optical axis of the camera;
      contour estimating circuitry configured to estimate, based on the plane estimated by the plane estimating circuitry and the angle of the plane, an object contour that is a contour of the object projected on the first image; and
      identifying circuitry configured to identify the object in the first image based on the information about the shape of the object stored in the memory and the object contour.

2. The robot of claim 1, wherein the contour estimating circuitry estimates, as the object contour, a shape deformed from the shape of the object stored in the memory corresponding to the angle of the plane.

3. The robot of claim 2, wherein the contour estimating circuitry estimates the object contour using the angle of the plane as an angle indicative of a posture of the object with respect to the optical axis of the camera.

4. The robot of claim 1, further comprising:
   edge extracting circuitry configured to extract an edge from the image, wherein
   the identifying circuitry identifies the object by comparing a shape of the edge with the object contour.

5. The robot of claim 1, further comprising:
   size estimating circuitry configured to estimate a second size that is a size of the object on the image captured by the camera, wherein
   the memory stores a first size that is an actual size of the object,
   the distance detecting circuitry detects a three-dimensional position of the part based on the distance at the part,
   the size estimating circuitry estimates the second size based on the three-dimensional position at the part, a two-dimensional position at the part on the image captured by the camera, and the first size, and
   the identifying circuitry identifies the object based on the object contour and the second size.

6. The robot of claim 1, further comprising:
   object detecting circuitry configured to detect a three-dimensional position and a posture of the object based on the first image of the object identified by the identifying circuitry and the angle of the plane.

7. The robot of claim 1, further comprising:
   surface range extracting circuitry configured to extract a surface range on the first image corresponding to a surface state of the object, wherein
   the memory stores information on the surface state of the object,
   the surface range extracting circuitry extracts the surface range based on the information on the surface state stored in the memory, and
   the identifying circuitry identifies the object on the first image based on the object contour and the surface range.

8. The robot of claim 1, further comprising:
   periphery searching circuitry configured to search, on the first image, around the object identified by the identifying circuitry, wherein
   the periphery searching circuitry detects another object similar to the identified object based on the object contour.

9. The robot of claim 1, wherein
   the hand is an end effector configured to perform processing to an article, and
   the robot further comprises a controller configured to control operations of the end effector and the second arm based on an image of the article as the object identified by the identifying circuitry.

10. The robot of claim 9, wherein
the image processor detects a three-dimensional position and posture of the article based on the image of the article identified by the identifying circuitry and the angle of the plane, and
the controller controls the operations of the end effector and the second arm based on the three-dimensional position and posture of the article.

11. A robot system, comprising:
the robot of claim 1; and
a user interface configured to manipulate the robot.

* * * * *